United States Patent
Richards et al.

(10) Patent No.: US 7,594,763 B2
(45) Date of Patent: Sep. 29, 2009

(54) FIBER OPTIC DELIVERY SYSTEM AND SIDE POCKET MANDREL REMOVAL SYSTEM

(75) Inventors: William M. Richards, Frisco, TX (US);
Paul D. Ringgenberg, Frisco, TX (US);
Cynthia S. Tuckness, Coppell, TX (US);
Chester S. McVay, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 631 days.

(21) Appl. No.: 11/038,369

(22) Filed: Jan. 19, 2005

(65) Prior Publication Data

US 2006/0159400 A1 Jul. 20, 2006

(51) Int. Cl.
*G02B 6/36* (2006.01)
*E21B 49/00* (2006.01)

(52) U.S. Cl. ........................................ 385/53; 166/385

(58) Field of Classification Search ............. 385/53–94; 166/335–368
See application file for complete search history.

(56) References Cited

U.S. PATENT DOCUMENTS

| | | | |
|---|---|---|---|
| 4,134,455 A | 1/1979 | Read | |
| 4,375,237 A | 3/1983 | Churchman | |
| 4,442,893 A | 4/1984 | Foust | |
| 4,483,584 A | 11/1984 | Gresty | |
| 4,624,309 A | 11/1986 | Schnatzmeyer | |
| 4,666,241 A | 5/1987 | Caron | |
| 4,690,212 A | 9/1987 | Termohlen | |
| 4,756,595 A | 7/1988 | Braun et al. | |
| 4,757,859 A | 7/1988 | Schnatzmeyer | |
| 4,824,198 A | 4/1989 | Anderton | |
| 4,825,946 A | 5/1989 | Schnatzmeyer | |
| 4,828,027 A | 5/1989 | Schnatzmeyer | |
| 4,846,269 A | 7/1989 | Schnatzmeyer | |
| 4,887,883 A | 12/1989 | Darbut et al. | |
| 4,921,438 A | 5/1990 | Godfrey et al. | |
| 5,048,610 A | 9/1991 | Ross et al. | |
| 5,243,681 A | 9/1993 | Bowen et al. | |
| 5,251,708 A | 10/1993 | Perry et al. | |

(Continued)

FOREIGN PATENT DOCUMENTS

GB 2318397 4/1998

(Continued)

OTHER PUBLICATIONS

Halliburton presentation entitled, "DTS Conceptual Completions", Dec. 3, 2002.

(Continued)

*Primary Examiner*—Tina M Wong
(74) *Attorney, Agent, or Firm*—Marlin R. Smith

(57) ABSTRACT

A fiber optic delivery system and side pocket mandrel removal system. In one example, a system for making optical connections in a well includes an optical connector positioned in the well, and another optical connector displaceable into operative connection with the first optical connector after the first optical connector is positioned in the well. In another example, a method of making optical connections in a well includes the steps of: positioning a tubular string in the well; then installing an assembly in the tubular string, the assembly including an optical connector; and then displacing the optical connector into operative engagement with another optical connector in the tubular string.

97 Claims, 15 Drawing Sheets

U.S. PATENT DOCUMENTS

| | | | |
|---|---|---|---|
| 5,435,351 | A | 7/1995 | Head |
| 5,440,665 | A | 8/1995 | Ray et al. |
| 5,505,260 | A | 4/1996 | Andersen et al. |
| 5,577,925 | A | 11/1996 | Schnatzmeyer et al. |
| 5,645,438 | A | 7/1997 | Cairns |
| 5,645,483 | A | 7/1997 | Cushman |
| 5,727,630 | A | 3/1998 | Brammer |
| 5,778,978 | A | 7/1998 | Crow |
| 5,803,167 | A | 9/1998 | Bussear et al. |
| 5,825,963 | A | 10/1998 | Burgett |
| 5,831,156 | A | 11/1998 | Mullins |
| 5,947,198 | A | 9/1999 | McKee et al. |
| 6,006,828 | A | 12/1999 | Kluth et al. |
| 6,017,227 | A | 1/2000 | Cairns et al. |
| 6,062,073 | A | 5/2000 | Patton et al. |
| 6,152,608 | A | 11/2000 | Ghara et al. |
| 6,186,229 | B1 | 2/2001 | Martin et al. |
| 6,281,489 | B1 | 8/2001 | Tubel et al. |
| 6,302,203 | B1 | 10/2001 | Rayssiguier et al. |
| 6,325,146 | B1 | 12/2001 | Ringgenberg et al. |
| 6,332,787 | B1 | 12/2001 | Barlow et al. |
| 6,349,770 | B1 | 2/2002 | Brooks et al. |
| 6,378,610 | B2 | 4/2002 | Rayssiguier et al. |
| 6,439,778 | B1 | 8/2002 | Cairns |
| 6,464,405 | B2 | 10/2002 | Cairns et al. |
| 6,478,091 | B1 | 11/2002 | Gano |
| 6,527,052 | B2 | 3/2003 | Ringgenberg et al. |
| 6,527,441 | B1 | 3/2003 | Cranch et al. |
| 6,568,481 | B2 | 5/2003 | Koehler et al. |
| 6,666,274 | B2 | 12/2003 | Hughes |
| 6,668,921 | B2 | 12/2003 | Koehler et al. |
| 6,684,950 | B2 | 2/2004 | Patel |
| 6,734,805 | B2 | 5/2004 | Johnson |
| 6,736,545 | B2 | 5/2004 | Cairns et al. |
| 6,758,271 | B1 | 7/2004 | Smith |
| 6,758,272 | B2 | 7/2004 | Bixenman et al. |
| 6,766,853 | B2 * | 7/2004 | Restarick et al. ......... 166/242.6 |
| 6,776,636 | B1 | 8/2004 | Cameron et al. |
| 6,789,621 | B2 | 9/2004 | Wetzel et al. |
| 6,837,310 | B2 | 1/2005 | Martin |
| 6,874,361 | B1 * | 4/2005 | Meltz et al. .............. 73/152.32 |
| 6,933,491 | B2 | 8/2005 | Maida et al. |
| 6,951,252 | B2 | 10/2005 | Restarick |
| 6,983,796 | B2 | 1/2006 | Bayne et al. |
| 7,222,676 | B2 | 5/2007 | Patel et al. |
| 7,226,898 | B2 | 6/2007 | Grigsby et al. |
| 2002/0125008 | A1 | 9/2002 | Wetzel et al. |
| 2002/0162666 | A1 * | 11/2002 | Koehler et al. .............. 166/385 |
| 2003/0196820 | A1 | 10/2003 | Patel |
| 2004/0013391 | A1 | 1/2004 | Joseph, II |
| 2004/0065439 | A1 | 4/2004 | Tubel et al. |
| 2004/0173350 | A1 | 9/2004 | Wetzel et al. |
| 2004/0256127 | A1 | 12/2004 | Brenner et al. |
| 2005/0072564 | A1 | 4/2005 | Grigsby et al. |
| 2005/0074196 | A1 | 4/2005 | Grigsby et al. |
| 2005/0074210 | A1 | 4/2005 | Grigsby et al. |
| 2005/0092501 | A1 | 5/2005 | Chavers et al. |
| 2005/0109518 | A1 | 5/2005 | Blacklaw |
| 2005/0173111 | A1 * | 8/2005 | Bostick, III ............ 166/250.01 |
| 2005/0213897 | A1 | 9/2005 | Palmer et al. |
| 2006/0153487 | A1 | 7/2006 | McLellan |

FOREIGN PATENT DOCUMENTS

| | | |
|---|---|---|
| WO | WO 86/02173 | 4/1986 |
| WO | WO 03/046428 | 6/2003 |
| WO | WO 2005/054801 | 6/2005 |

OTHER PUBLICATIONS

Halliburton presentation entitled, "Greater Plutonio Completions Workshop", Mar. 12, 2003.

Halliburton presentation entitled, "'Development Status' Fiber Optic Compatible Downhole Completion Equipment", Jun. 22, 23, 24, 2004.
Search Report for PCT/US04/01863.
Search Report for PCT/US04/01856.
Otis Engineering drawing No. 41UP58701 dated May 4, 1993.
Halliburton Energy Services drawing No. 42 oo 210 dated Apr. 7, 2001.
International Search Report for PCT/US04/01857.
Search Report for UK application No. GB 0507890.2.
Intelligent Wells, "Optical Fiber Technology," dated Oct. 2002.
Intelligent Wells, "Oil field Applications of HydrOptics Technology," dated Oct. 2002.
World Oil, "World's first multiple fiber-optic intelligent well," dated Mar. 2003.
Underwater Magazine, "Underwater Mateable Connectors in the Military and Telecom Sectors," dated Sep./Oct. 2002.
Sea Technology, "The Ruggedization of Hybrid Wet-Mate Connectors," dated Jul. 2000.
Sea Technology, Optical Fiber and Connectors: Critical for Future Subsea Systems,: undated.
OTC 15323, "The Development and Application of HT/HP Fiber-Optic Connectors for use on Subsea Intelligent Wells," dated 2003.
Journal of Petroleum Technology, "Development of HP/HT Fiber-Optic Connectors for Subsea Intelligent Wells," dated Aug. 2003.
Sea Technology, "Hybrid Wet-Mate Connectors: 'Writing the Next Chapter'," dated Jul. 1997.
Tronic, "Tronic Fibre Optic Wellhead Feedthrough Connectors," undated.
Tronic, "FireFly Project," undated.
OTC 13235, "Extending Tieback Distances: Wet-Mate Connectors, Enabling Technologies for Critical Systems Developments," dated 2001.
Ocean Design, "Underwater Mateable Connectors: Enabling Technology and the Next Step in Performance for Navy and Telecom Applications," presented at Underwater Intervention Conference, 2002.
W Magazine, "Intelligent Well Completion, the next steps," dated Sep. 2002.
Production Optimization, "Intelligent Completions," undated.
Seacon, "MicroStar, 4-channel, Wet-Mate, Optical Connector," undated.
Ocean Design, Inc., "Ocean Design Introduces New I-Conn Product Line," dated Jul. 22, 2002.
Weatherford, "Intelligent Well Briefing," dated May 14, 2003.
"Pioneering Fibre Optic Completion Installation in the Mahogany Field, Offshore Trinidad," undated.
PES, "Model of Fibre Optic Orientating Disconnect Head," dated Oct. 23, 2000.
SPE 71676, "The Use of Fiber-Optic Distributed Temperature Sensing and Remote Hydraulically Operated Interval Control Valves for the Management of Water Production in the Douglas Field," dated 2001.
SPE 84324, "Brunei Field Trial of a Fibre Optic Distributed Temperature Sensor (DTS) System in a 1,000 m Open Hole Horizontal Oil Producer," dated 2003.
Focal Technologies Corporation, Product Brochure for Model 286, dated Apr. 15, 2003.
The Expro Group brochure, "Tronic Fibre Optic Wellhead Feedthrough Connectors", undated.
Seacon brochure, "Fiber Optic Connectors", undated.
Ocean Design, Inc. brochure, "NRH Connector", undated.
Ocean Design, Inc. brochure, "Hybrid Wet-Mate", 2000.
Ocean Design, Inc. brochure, "I-Conn; Wet-Mateable Optical Connector", 2000.
Seacon Advanced Products data sheets, pp. 22-1 through 22-20.
Norfolk Wire & Electronics "Optical Fiber Splice Protectors—FSP", dated 2003.
Halliburton, "X-Line® and R-Line® Landing Nipples and Lock Mandrels; Set and Lock Reliability in Subsurface Flow Control Equipment with a Total Completion Package", dated Mar. 1997.
Office Action for U.S. Appl. No. 10/680,440 dated Jul. 5, 2006.

Office Action issued for U.S. Appl. No. 11/560,724 dated Aug. 9, 2007 (23 pages).
Office Action issued for U.S. Appl. No. 11/873,849 dated Sep. 12, 2007 (12 pages).
Office Action issued for U.S. Appl. No. 10/873,849 dated May 30, 2008 (13 pages).
International Preliminary Report on Patentability for PCT/US2004/001863.
International Preliminary Report on Patentability for PCT/US2004/001856.
International Preliminary Report on Patentability for PCT/US2004/001857.
Written Opinion for PCT/US2004/001863.
Written Opinion for PCT/US2004/001856.
Written Opinion for PCT/US2004/001857.
Office Action for U.S. Appl. No. 10/873,849 dated May 5, 2006.

* cited by examiner

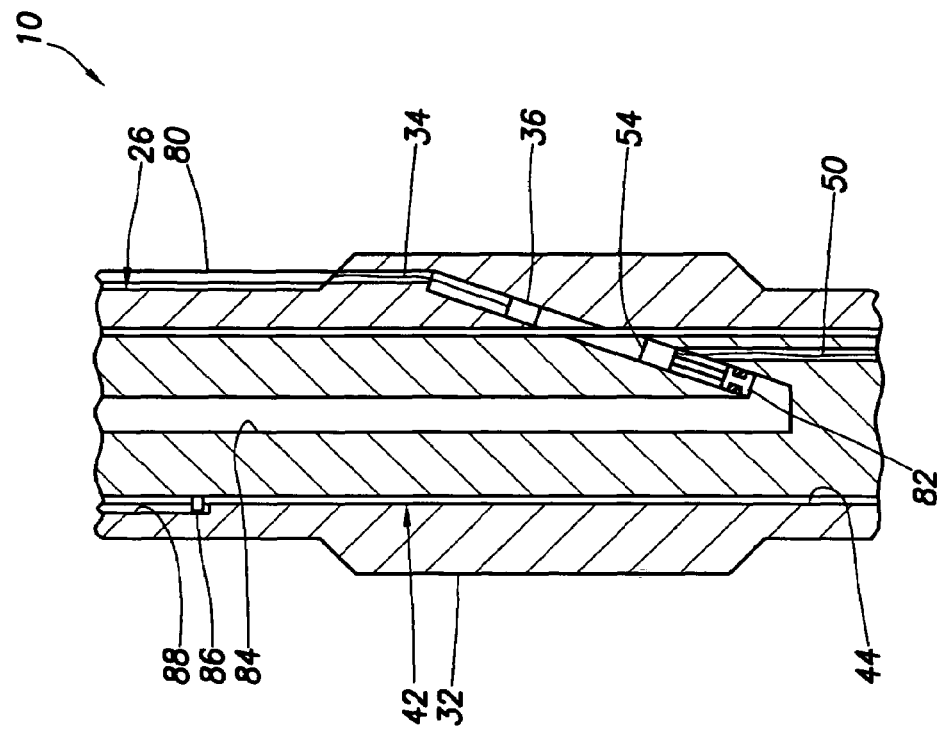
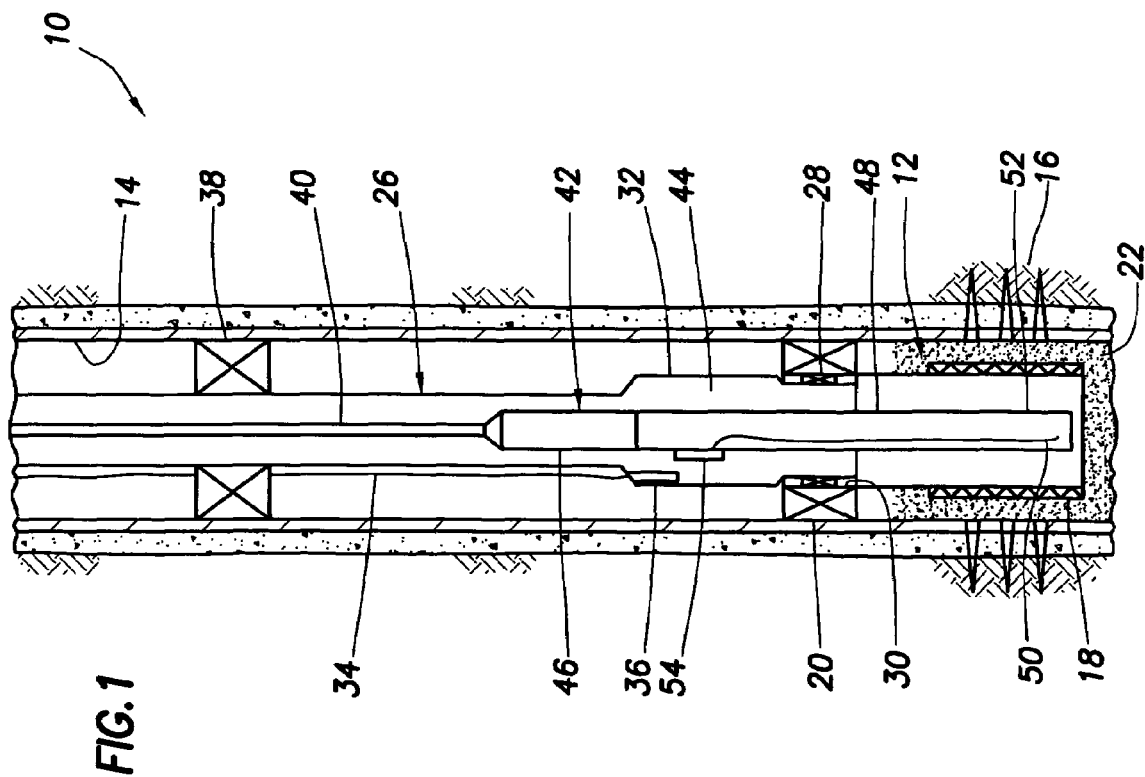

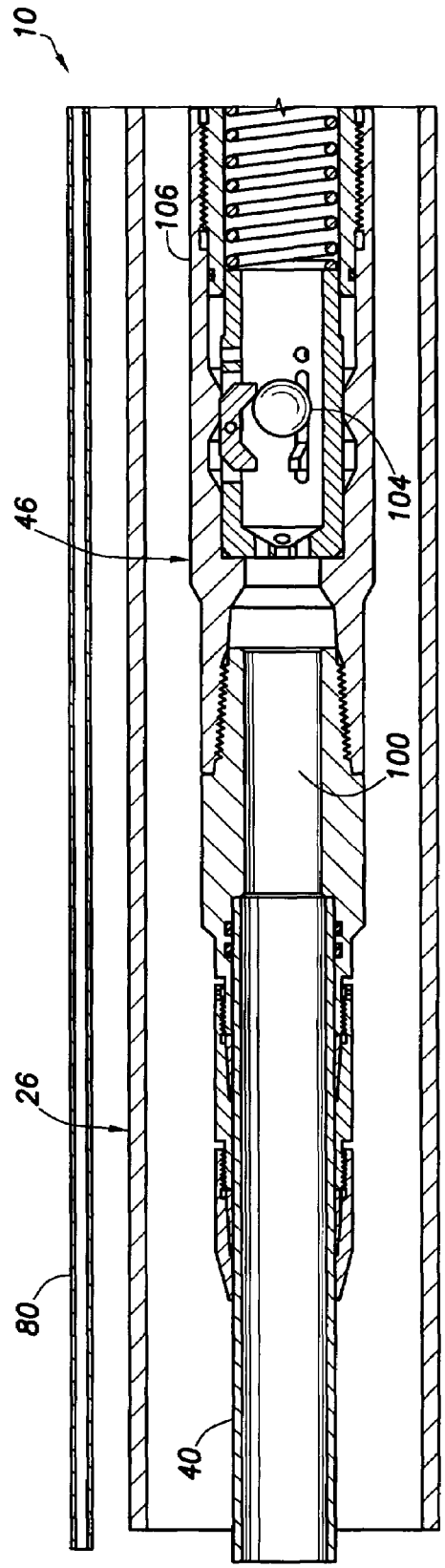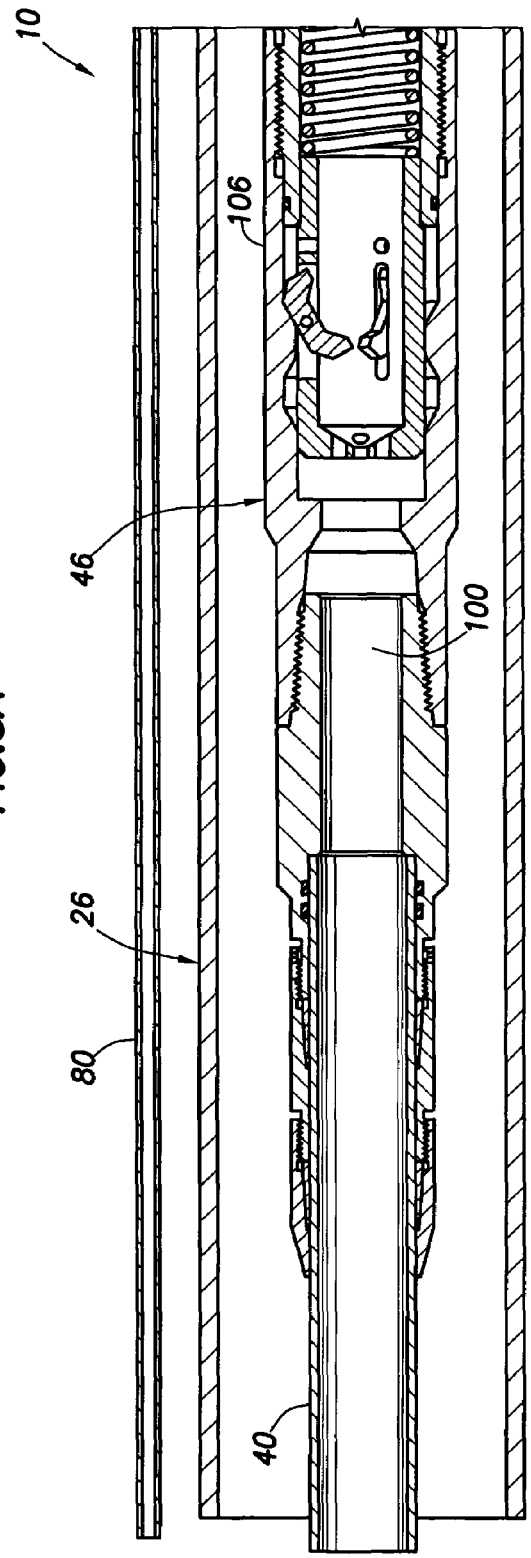

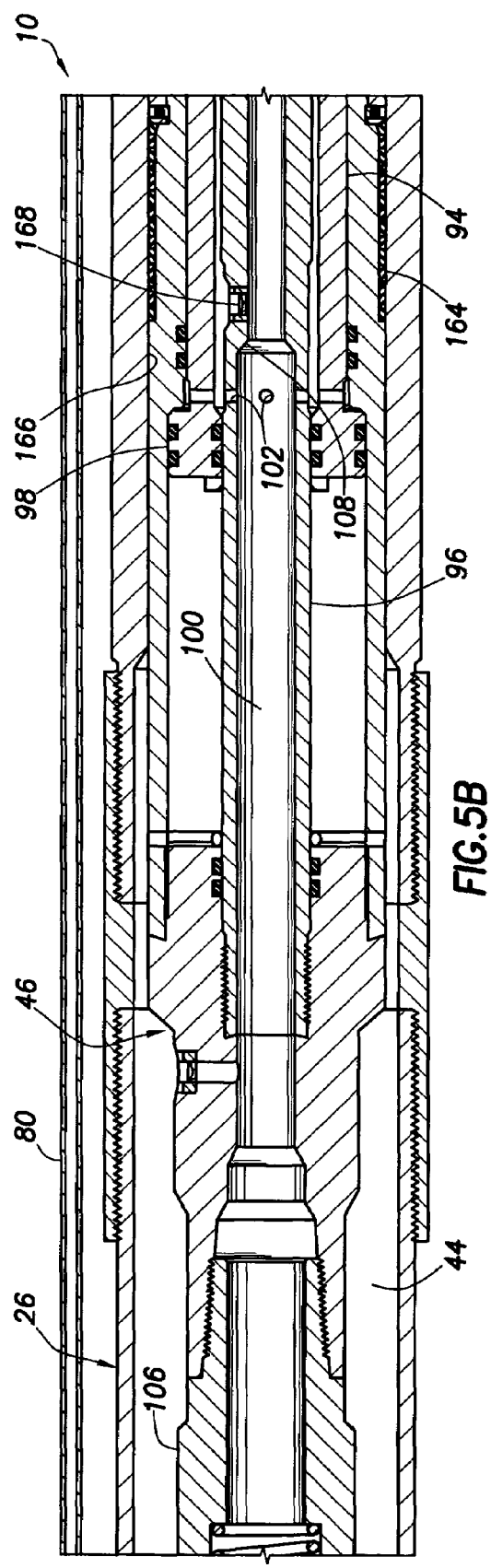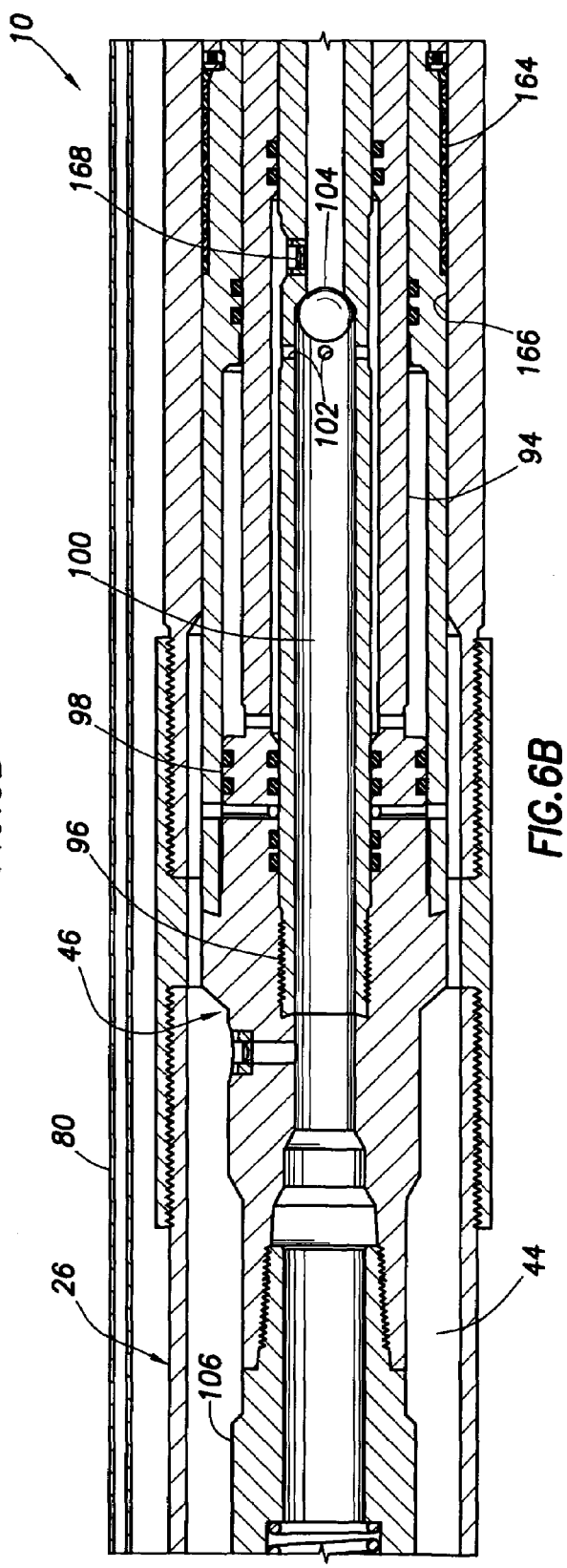

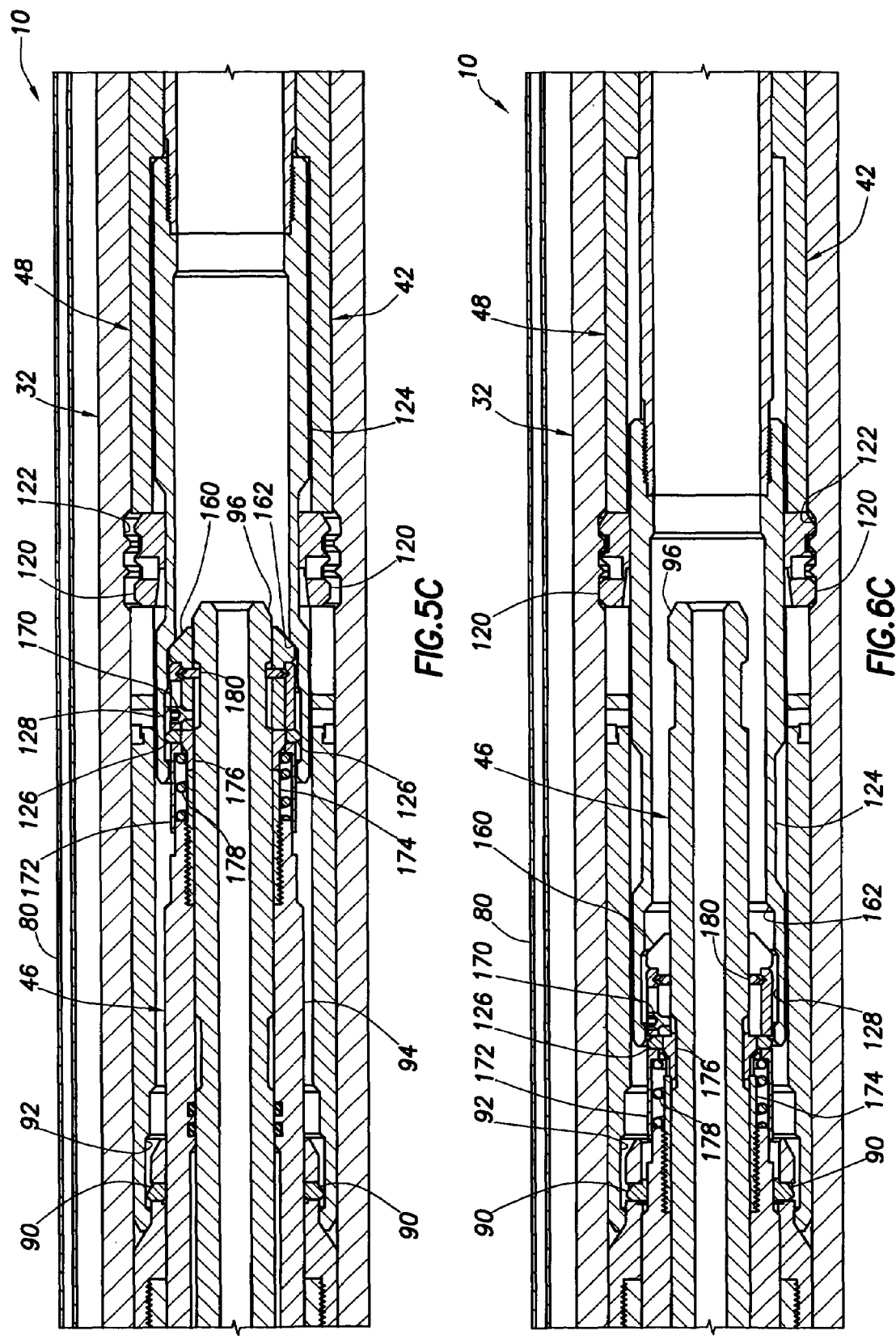

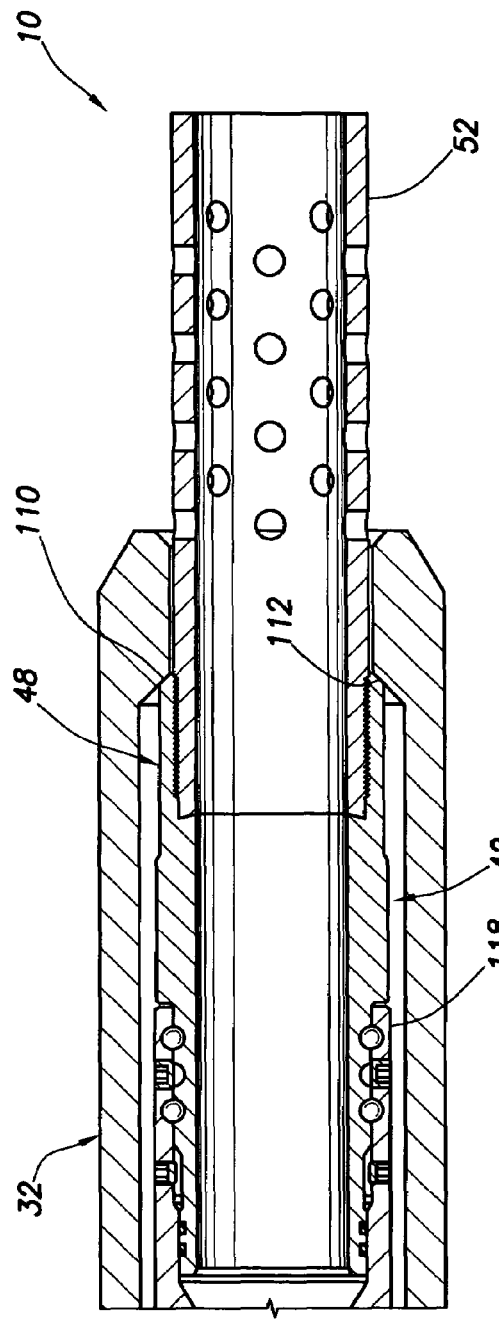
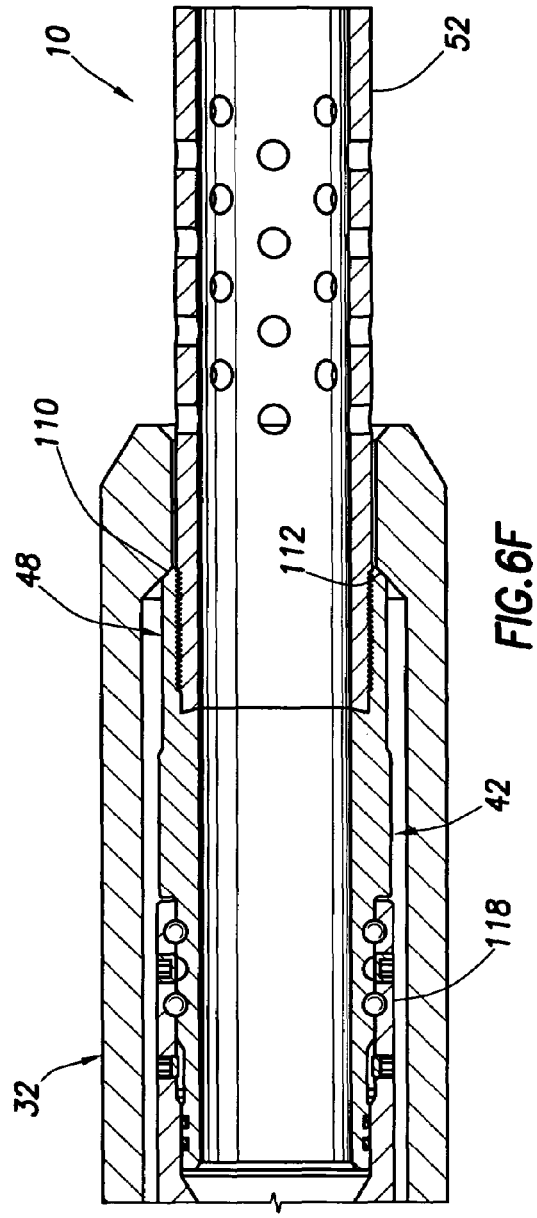
FIG.5F
FIG.6F

FIBER OPTIC DELIVERY SYSTEM AND SIDE POCKET MANDREL REMOVAL SYSTEM

CROSS-REFERENCE TO RELATED APPLICATION

The present application is related to copending application Ser. No. 10/680,625, filed Oct. 7, 2003, the entire disclosure of which is incorporated herein by this reference.

BACKGROUND

The present invention relates generally to operations performed and equipment utilized in conjunction with a subterranean well and, in a particular example described herein, more particularly provides a fiber optic delivery system and side pocket mandrel removal system.

It would be very desirable to be able to use an optical line, such as an optical fiber or other optical conduit, to monitor production from a well, for example, to monitor water encroachment, identify production sources, evaluate stimulation treatments, gravel packing effectiveness and completion practices, etc. It is known to use fiber optic lines to transmit indications from downhole sensors, to communicate in the downhole environment and to use a fiber optic line as a sensor.

However, fiber optic lines may be damaged in operations such as gravel packing, expanding tubulars downhole, etc. For this reason, it would be beneficial to be able to install a fiber optic line in a completion, for example, after a completion assembly has been installed in a well and gravel packing operations are completed, or after an assembly has been expanded, etc.

Therefore, it may be seen that there exists a need for improved fiber optic delivery systems. Such delivery systems could include systems for making optical connections between optical lines in a well. Other applications could benefit from the advantages provided by these systems, as well.

SUMMARY

In carrying out the principles of the present invention, in accordance with one of multiple embodiments described below, an optical connection system is provided for use in a well. In this specific embodiment, the application is a fiber optic delivery system which utilizes a side pocket mandrel configuration, but the invention is not limited to this application, configuration or embodiment. Methods of making optical connections in a well are also provided.

In one aspect of the invention, a system for making optical connections in a well is provided. The system includes an optical connector positioned in the well. Another optical connector is displaced into operative connection with the first optical connector after the first optical connector is positioned in the well.

In another aspect of the invention, a system for making optical connections in a subterranean well includes an optical connector and a shield. The shield has a position in which the shield is positioned between the optical connector and an interior passage of a tubular string, and another position in which the optical connector is exposed to the interior passage of the tubular string.

In a further aspect of the invention, a system for making optical connections in a well includes an assembly having releasably attached sections. An optical line extends between the sections when the sections are detached from each other in the well.

In yet another aspect of the invention, a system for making optical connections in a well includes a tubular string having an optical connector. An assembly is received in the tubular string, the assembly including another optical connector. Force applied to the assembly causes the optical connector of the assembly to displace and operatively connect with the optical connector of the tubular string.

In another aspect of the invention, a method of making optical connections in a well includes the steps of: positioning a tubular string in the well; then installing an assembly in the tubular string, the assembly including an optical connector; and then displacing the optical connector into operative engagement with another optical connector in the tubular string.

These and other features, advantages, benefits and objects of the present invention will become apparent to one of ordinary skill in the art upon careful consideration of the detailed description of representative embodiments of the invention hereinbelow and the accompanying drawings.

BRIEF DESCRIPTION OF THE DRAWINGS

FIG. 1 is a schematic cross-sectional view of a fiber optic distributed temperature sensing system embodying principles of the present invention;

FIG. 4 is a schematic cross-sectional view of yet another alternate fiber optic delivery system embodying principles of the present invention;

FIGS. 5A-F are cross-sectional views of a further alternate fiber optic delivery system embodying principles of the present invention, the system being shown in a run-in configuration;

FIGS. 6A-F are cross-sectional views of the fiber optic delivery system of FIGS. 5A-F, the system being shown in an installed configuration;

DETAILED DESCRIPTION

Figure 2:
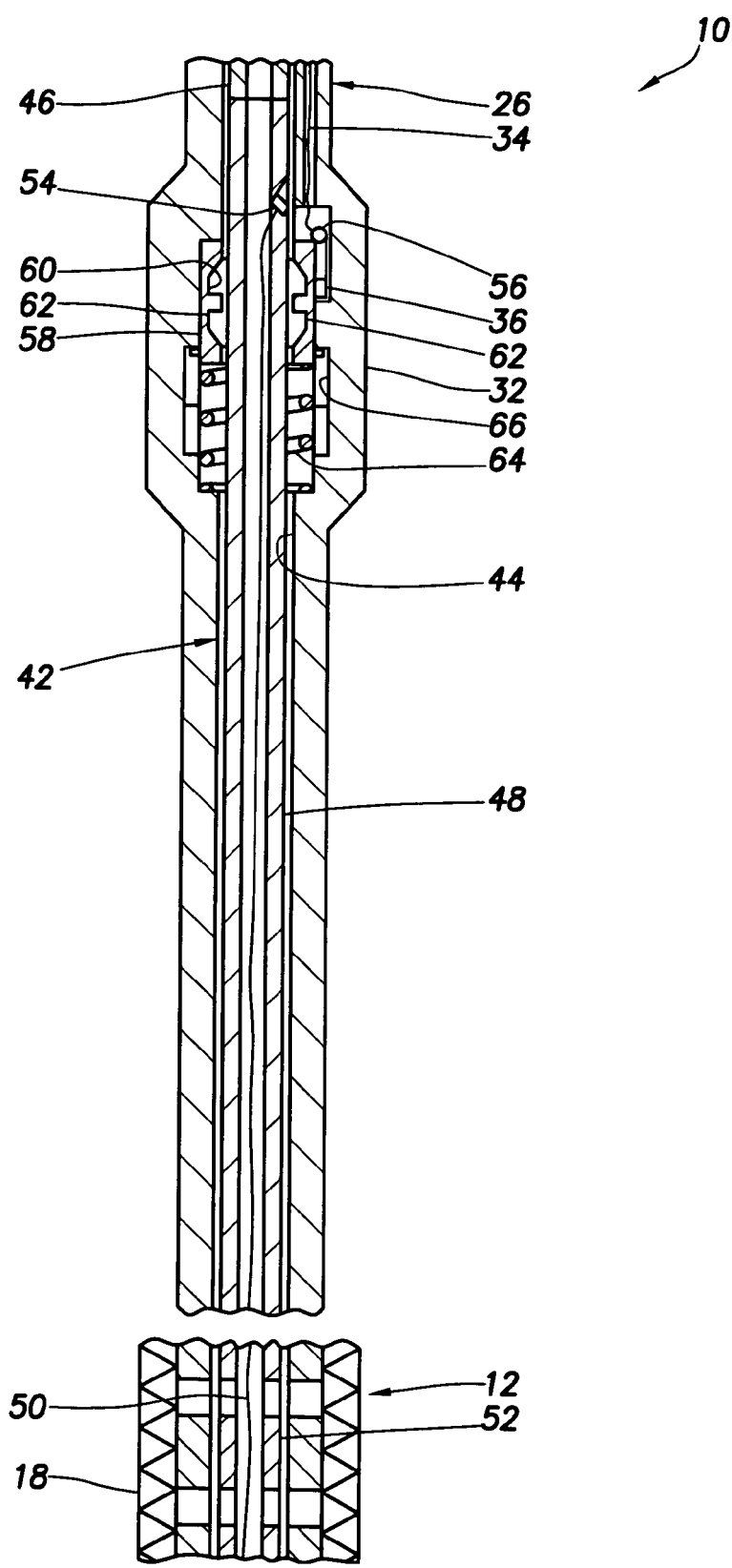
FIG. 2 is an enlarged scale schematic cross-sectional view of a fiber optic delivery system embodying principles of the present invention, and which may be used in the system of FIG. 1.

Representatively illustrated in FIG. 1 is a system 10 which embodies principles of the present invention. In the following description of the system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which are not limited to any specific details of these embodiments.

As depicted in FIG. 1, a gravel packing assembly 12 has been positioned in a wellbore 14 which intersects a formation or zone 16. All or part of the gravel packing assembly 12 may be positioned in a cased or uncased portion of the wellbore 14.

The assembly 12 includes a well screen 18 and a gravel pack packer 20. The packer 20 is set in the wellbore 14, and the annulus between the well screen 18 and the wellbore is packed with gravel 22, using techniques well known to those skilled in the art. A fluid loss control device (not shown) may be used to prevent fluid in the wellbore 14 from flowing into the formation 16 after the gravel packing operation.

A tubular string 26, such as a production tubing string, is conveyed into the wellbore 14 and engaged with the gravel packing assembly 12. Seals 28 carried on the tubular string 26 sealingly engage a seal bore 30 of the assembly 12, such as a polished bore of the packer 20.

The tubular string 26 includes a generally tubular receptacle or housing assembly 32. The housing assembly 32 may be configured similar to an item of equipment known to those skilled in the art as a side pocket mandrel. An optical line 34 (such as an optical fiber or other optical conduit) extends from a remote location (not shown), such as the earth's surface or another location in the well, to an optical connector 36 located in the housing assembly 32.

As used herein, the term "optical connector" indicates a connector which is operably coupled to an optical line so that, when one optical connector is connected to another optical connector, light may be transmitted from one optical line to another optical line. Thus, each optical connector has an optical line operably coupled thereto, and the optical lines are connected for light transmission therebetween when the connectors are connected to each other.

Although in the following description of the system 10 and associated method only one optical line 34 is specifically described, it is to be clearly understood that any number of optical lines may be used in the system and method, and any number of connections between optical lines may be made downhole in keeping with the principles of the invention. For example, in a seismic application, there may be approximately 12 or more optical lines 34 connected downhole.

In addition, other types of lines may be used in conjunction with the optical line 34. For example, hydraulic and electrical lines may be connected downhole along with the optical line 34. These other types of lines may be connected downhole using the same connectors as the optical line, or other additional connectors may be used.

The tubular string 26 may also include a packer 38 which is set in the wellbore 14 to secure the tubular string. Note that the optical line 34 extends longitudinally through the packer 38. Alternatively, the packer 38 could be positioned below the housing 32, in which case the optical line 34 may not extend through the packer.

A conveyance 40 is used to transport another assembly 42 into an inner passage 44 extending through the tubular string 26 and housing 32. Representatively, the conveyance 40 is a coiled tubing string, but any other conveyance, such as wireline, slickline, segmented tubing, etc., may be used if desired.

The assembly 42 includes a running tool 46 and a probe 48. The probe 48 has an optical line 50 extending longitudinally within, or external to, a perforated tubular member 52 attached to the running tool 46. The optical line 50 could alternatively extend within a sidewall of the tubular member 52.

The optical line 50 is operably coupled to another optical connector 54. As discussed above, more than one optical line 50 may be used in the system 10, and other types of lines (such as hydraulic and/or electrical) may be used and connected using the connectors 36, 54.

When the probe 48 is appropriately positioned in the housing 32, the probe is longitudinally and rotationally oriented relative to the housing, so that the optical connectors 36, 54 are aligned with each other, and the probe is anchored in place relative to the housing. In this position, the optical line 50 extends longitudinally within the gravel packing assembly 12.

Various methods described below may be used to cause the connectors 36, 54 to operatively connect with each other. For example, pressure may be altered in the conveyance 40 to the running tool 46, causing the connector 54 to displace toward the connector 36. As another example, the assembly 42 may be displaced within the housing 32 in a manner which causes the connector 54 to operatively engage the connector 36. As yet another example, pressure may be altered in the housing assembly 32 to displace the connector 36 into operative engagement with the connector 54.

The connectors 36, 54 are, thus, operatively connected. Note that either of the connectors 36, 54 can be a "male" connector, and the other can be a "female" connector, if desired. Of course, other types of connector configurations can be used which are not necessarily "male" or "female".

The optical line 50 may now be used to monitor one or more parameters of the well environment. For example, the optical line 50 may be configured to sense temperature along its length. It is well known to those skilled in the art that a fiber optic line may be used as a distributed temperature sensor. By positioning the optical line 50 longitudinally within the gravel packing assembly 12, the optical line can sense temperature distribution along the wellbore 14 as fluid flows from the formation 16 into the gravel packing assembly 12.

An influx of water from the formation 16 into the wellbore 14 may be located by monitoring the temperature distribution along the gravel packing assembly 12 using the optical line 50. Other parameters, such as pressure, etc., may be sensed using the optical line 50 in keeping with the principles of the invention.

In specific embodiments described below, the running tool 46 may be used to make multiple attempts at connecting the connectors 36, 54, in the event that an initial attempt is unsuccessful. The running tool 46 may be removed from the well, leaving the probe 48 portion of the assembly 42 anchored in the passage 44, and with the optical connectors 36, 54 connected. Thereafter, the running tool 46 may be reconnected with the probe 48 portion of the assembly 42, for example, to retrieve it from the well for maintenance, repair, replacement, etc.

Described below are various alternate methods for installing the probe 48, and for connecting the connectors 36, 54. However, it should be clearly understood that the invention is not limited to any of the specific details of the methods described below.

Referring now to FIG. 2, a somewhat more detailed cross-sectional view of the system 10 is illustrated. For clarity, the well environment about the tubular string 26 and gravel packing assembly 12 is not shown in FIG. 2.

In this embodiment, the optical connector 36 is pivotably disposed within the housing 32. At the appropriate time, the connector 36 will rotate about a pivot 56 inwardly toward the passage 44. Until then, the connector 36 is retained in the sidewall of the housing 32 and isolated from the passage 44 by a shield 58.

As depicted in FIG. 2, the shield 58 is generally tubular shaped and has a profile 60 formed internally thereon. Cooperatively shaped engagement devices, such as lugs, dogs or keys 62, are carried on the assembly 42 for engagement with the profile 60.

A biasing device 64, such as a spring, biases the shield 58 toward the position depicted in FIG. 2 where the shield is between the passage 44 and the connector 36. In this manner, the shield 58 protects the connector 36 from other tools, abrasive flow, debris, etc. which may pass through the passage 44.

However, when the keys 62 engage the profile 60 and the assembly 42 is displaced downwardly, the shield 58 is also displaced downwardly against the force exerted by the biasing device 64 to a position in which the connector 36 is exposed to the passage 44 and can pivot into (or at least toward) the passage. A ratchet device 66 (e.g., of the type known to those skilled in the art as a J-slot mechanism) may be used to control displacement of the shield 58 to its two positions.

For example, the ratchet device 66 can be configured to select which of the positions the shield 58 displaces to in response to displacement of the assembly 42. As depicted in FIG. 2, the ratchet device 66 will cause the shield 58 to displace to its lowermost position (in which the connector 36 is exposed to the passage 44) when the assembly 42 is downwardly displaced. In response to a next downward displacement of the assembly 42, the ratchet device 66 will allow the shield 58 to displace back up to the position shown in FIG. 2.

After the assembly 42 is displaced downwardly from its position shown in FIG. 2, the connector 36 will be exposed to the passage 44 and the connector 54 will be aligned with the connector 36. A subsequent upward displacement of the assembly 42 may then be used to operatively connect the connectors 36, 54. However, note that the system 10 may be configured so that this upward displacement of the assembly 42 may not be required to connect the connectors 36, 54, for example, if the connectors are connected when the connector 36 pivots toward the passage 44, or if the connectors are connected when the assembly displaces downward, etc.

Since, at this point, the shield 58 is attached to the assembly 42 via the engagement between the keys 62 and the profile 60, the upward biasing force exerted by the biasing device 64 may be used to maintain the connection between the connectors 36, 54. The running tool 46 may then be disconnected from the assembly 42 and retrieved from the well. If the first attempt to operatively connect the connectors 36, 54 is unsuccessful, the running tool 46 may remain attached to the probe 48 while the assembly 42 is displaced alternately upward and downward to repeatedly engage and disengage the connectors until an operative connection is made.

When it is desired to retrieve the probe 48 for maintenance, repair, replacement, etc., the running tool 46 may be again connected to the probe. Downward displacement of the assembly 42 will disconnect the connectors 36, 54, and a subsequent upward displacement will return the shield 58 to the position shown in FIG. 2. The keys 62 may then be disengaged from the profile 60, and the assembly 42 may be retrieved from the well.

Note that the system 10 could be configured so that other types of displacements could be used to connect the connectors 36, 54. For example, the connectors 36, 54 could be connected when the assembly 42 is displaced downward instead of upward, or in response to rotation of the assembly in the passage 44, etc. Any type of displacement of the assembly 42 may be used to connect the connectors 36, 54 in keeping with the principles of the invention.

Furthermore, although the system 10 is described herein as accomplishing an operative connection between the connectors 36, 54 within the passage 44 of the tubular string 26, such connection could be made elsewhere. For example, the shield 58 could isolate the connector 36 in the tubular string 26 from an exterior of the tubular string (such as in an annulus between the tubular string and the wellbore 14), and the connector 54 positioned exterior to the tubular string could be operatively connected to the connector 36 after the shield is displaced. In each of the embodiments described herein, it should be understood that it is not necessary for the connectors 36, 54 to be connected within an interior passage of a tubular string.

Figure 3:
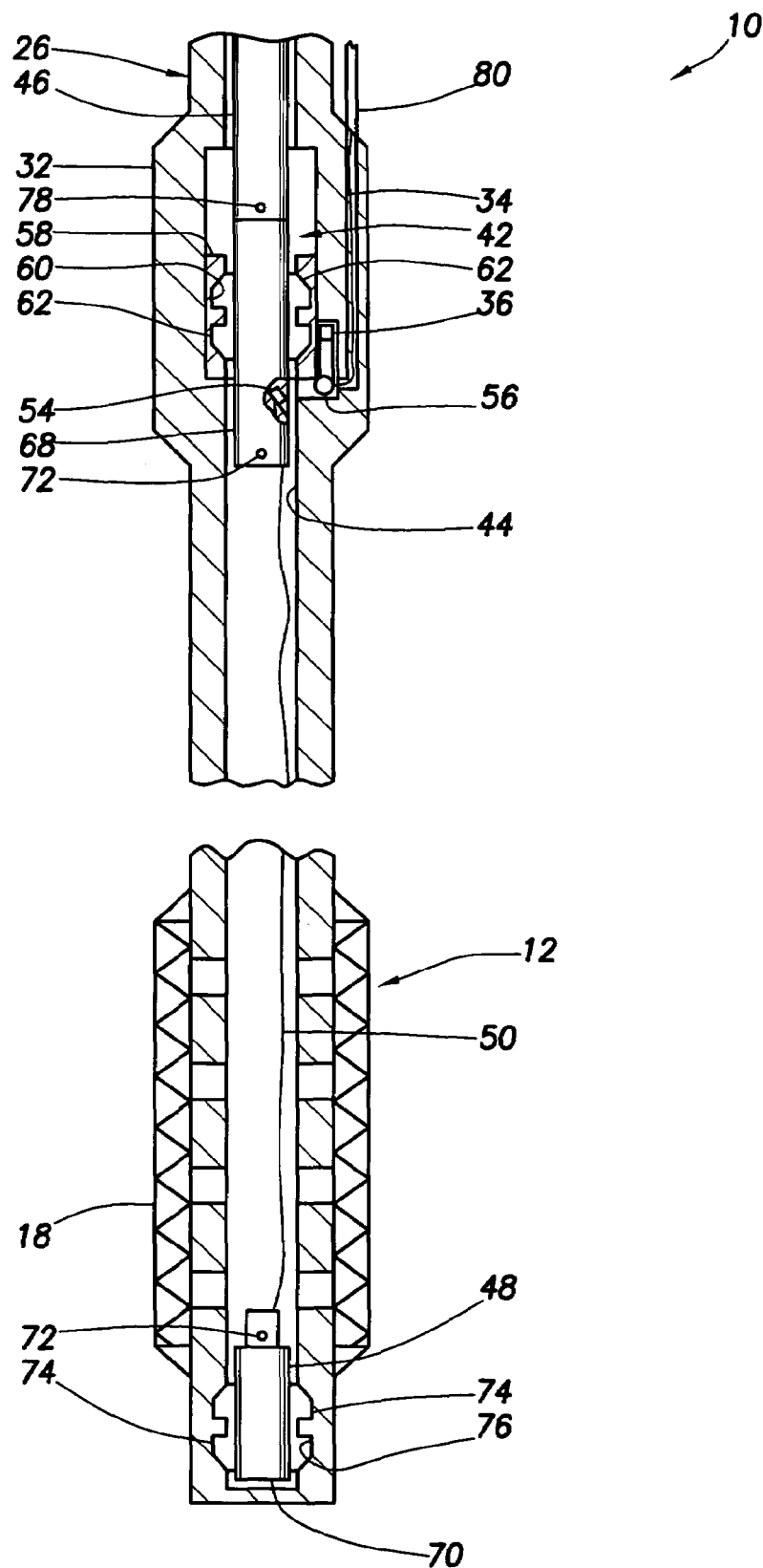
FIG. 3 is a schematic cross-sectional view of an alternate fiber optic delivery system embodying principles of the present invention.

Referring now to FIG. 3, the system 10 is depicted in another alternate configuration in which the probe 48 does not include the tubular member 52. Instead, the probe 48 includes sections 68, 70 which are detached from each other in order to extend the optical line 50 through the gravel packing assembly 12.

When the assembly 42 is conveyed into the tubular string 26, the sections 68, 70 are attached to each other, for example, using one or more shear pins 72. The upper section 68 has the keys 62 attached thereto, and the lower section 70 also has keys 74 thereon. The keys 62, 74 are configured so that they may pass downwardly through the profile 60 in the shield 58.

With the sections 68, 70 attached to each other, the optical line 50 is contained within one or both of the sections. For example, the optical line 50 could be coiled within the lower section 70. One end of the optical line 50 is attached to the lower section 70, and the other end of the optical line is operably coupled to the connector 54 in the upper section 68.

The probe 48 is displaced downwardly through the tubular string 26, through the housing 32 (including through the shield 58), and into the gravel packing assembly 12. The keys 74 on the lower section 70 are then engaged with a profile 76 formed internally in a lower end of the gravel packing assembly 12, preferably located below the screen 18.

This engagement between the keys 74 and profile 76 secures the lower section 70 in the gravel packing assembly 12. A subsequent upwardly directed force applied to the assembly 42 causes the shear pin 72 to shear, thereby detaching the sections 68, 70 from each other.

The lower section 70 remains engaged with the profile 76 while the upper section 68 and the rest of the assembly 42 is displaced upward through the gravel packing assembly 12 and into the tubular string 26. As the sections 68, 70 are increasingly separated from each other, the optical line 50 is extended through the interior of the gravel packing assembly 12 and into the passage 44 of the tubular string 26.

Further upward displacement of the upper section 68 causes the keys 62 to engage the profile 60 (as depicted in FIG. 3) and shift the shield 58 upward. Note that in this alternate configuration, the shield 58 is displaced upward to expose the connector 36 to the passage 44.

The optical line 34 extends through a conduit 80 external to the tubular string 26, instead of extending upwardly through a sidewall of the tubular string as depicted in FIG. 2. In addition, a ratchet device is not depicted in FIG. 3 for controlling displacement of the shield 58, but one could be provided if desired.

After the shield 58 has been displaced upward to expose the connector 36 to the passage 44 and permit the connector to pivot toward the passage, the connectors 36, 54 are aligned and subsequent downward displacement of the upper section 68 may be used to operatively connect the connectors. As described above, any type of displacement may be used to connect the connectors 36, 54 in keeping with the principles of the invention.

Note that a biasing device is not used in the configuration illustrated in FIG. 3, since a weight of the upper section 68 may be sufficient to maintain the connection between the connectors 36, 54. However, a biasing device could be used if desired.

The running tool 46 may then be disconnected from the assembly 42 (e.g., by shearing one or more shear pins 78) and retrieved from the well. If the first attempt to operatively connect the connectors 36, 54 is unsuccessful, the running tool 46 may remain attached to the upper section 68 and used to displace the upper section alternately upward and downward to repeatedly engage and disengage the connectors until an operative connection is made. As with the configuration described above and depicted in FIG. 2, the probe 48 may be conveniently retrieved for maintenance, repair, replacement, etc.

Referring now to FIG. 4, another alternate method of connecting the connectors 36, 54 in the system 10 is illustrated. A lower portion of the assembly 42 is not shown in FIG. 4, but the assembly could have the probe 48 as depicted in any of FIGS. 1-3 at the lower portion thereof.

In this alternate method, note that the connector 36 in the housing 32 is not pivotably mounted. Preferably, the connector 36 does not displace at all in this method, so that all moving parts are included in the assembly 42, which is relatively convenient to retrieve, repair and replace. However, it should be clearly understood that the connector 36 could displace (for example, the connector 36 could pivot or otherwise displace relative to the housing 32), and other moving parts could be used in the housing (such as the shield 58 and biasing device 64 described above), without departing from the principles of the invention.

The assembly 42 in the configuration depicted in FIG. 4 includes a piston 82 attached to the connector 54. One side of the piston 82 is in communication with an internal passage 84 of the assembly 42, and the other side of the piston is exposed to pressure in the passage 44 of the tubular string 26. The passage 84 could, for example, be in communication with the interior of a coiled tubing string used as the conveyance 40 to convey the assembly 42 into the tubular string 26.

Greater pressure in the passage 84 than in the passage 44 will cause the piston 82 and attached connector 54 to displace outward toward the other connector 36 in order to operatively connect the connectors. Greater pressure in the passage 44 than in the passage 84 will cause the piston 82 to be biased inward, e.g., to displace the connector 54 away from the connector 36 to disconnect the connectors.

While the assembly 42 is being conveyed into the tubular string 26, pressure in the passage 84 may be maintained less than pressure in the passage 44 to ensure that the connector 54 does not displace outward and become damaged. This may be accomplished by providing a less dense fluid in the passage 84 as compared to fluid in the passage 44, providing a gas cushion (e.g., air or nitrogen) in the passage 84 with the passage 44 having a higher level of liquid therein, etc.

When it is desired to outwardly displace the connector 54, pressure is increased in the passage 84 relative to pressure in the passage 44, e.g., by applying pressure to the interior of the coiled tubing conveyance 40 at the surface, thereby operatively connecting the connectors 36, 54. Other methods of increasing pressure in the passage 84 relative to pressure in the passage 44 may be used in keeping with the principles of the invention, such as by bleeding off any pressure applied to the passage 44, adding more dense fluid to the interior of the conveyance 40, etc.

When it is desired to disconnect the connectors 36, 54, pressure is decreased in the passage 84 relative to pressure in the passage 44, e.g., by releasing the pressure previously applied to the coiled tubing conveyance 40 at the surface. Other methods of decreasing pressure in the passage 84 relative to pressure in the passage 44 may be used in keeping with the principles of the invention, such as by applying increased pressure to the passage 44, providing less dense fluid in the interior of the conveyance 40, etc.

If an initial attempt to connect the connectors 36, 54 is unsuccessful, the connector 54 may be displaced alternately inward and outward by reversing the pressure differential across the piston 82 as many times as is necessary to achieve a satisfactory connection between the connectors.

As depicted in FIG. 4, the connectors 36, 54 are axially aligned, so that when the piston 82 displaces the connector 54 outward it will operatively connect with the connector 36. Rotational and longitudinal alignment of the connectors 36, 54 may be provided by engagement between an alignment member 86 of the assembly 42 and an internal alignment profile 88 in the tubular string 26. Note that the member 86 could be provided on the tubular string 26, the profile 88 could be provided on the assembly 42, and other types of alignment devices could be used, in keeping with the principles of the invention.

Another more detailed alternate configuration of the system 10 is illustrated in FIGS. 5A-F & 6A-F. In FIGS. 5A-F the system 10 is depicted in a configuration in which the assembly 42 is being installed. In FIGS. 6A-F the system 10 is depicted in a configuration in which the assembly 42 has been installed and the running tool 46 has just been detached from the probe 48.

In FIG. 5C it may be seen that the running tool 46 is releasably secured to the probe 48 by means of lugs 90 outwardly engaged into an internal profile 92 formed in an upper end of the probe. The lugs 90 are outwardly supported by an outer surface of a generally tubular sleeve 94 reciprocably disposed on a generally tubular mandrel 96 of the running tool 46.

At an upper end of the sleeve 94 is an annular shaped piston 98 which is exposed on an upper side to pressure in the passage 44 in the tubular string 26, and on a lower side to pressure in an internal passage 100 of the running tool 46 via ports 102 formed radially through the mandrel 96. The passage 100 extends completely through the running tool 46 and is in communication with the interior of the coiled tubing conveyance 40, so that circulation may be provided as the assembly 42 is conveyed into the well.

Initially, as the assembly 42 is being installed, the passage 100 is open and is then closed to flow therethrough so that pressure may be increased in the passage 100 relative to pressure in the passage 44 of the tubular string 26. However, if desired, the passage 100 could be initially closed.

The passage 100 is preferably closed by releasing a ball 104 or other plugging device from a release mechanism 106 of the running tool 46 after the assembly 42 is properly positioned in the housing 32. The release mechanism 106 releases the ball 104 in response to a predetermined rate of downward (circulating) fluid flow through the passage 100.

The ball 104 is shown sealingly engaged with an internal seat 108 in FIG. 6B after the ball is released from the mechanism 106. At this point, pressure may be increased in the passage 100 relative to the passage 44 by, for example, applying pressure to the interior of the conveyance 40 at the surface.

This differential pressure will bias the piston 98 upwardly. When a sufficient biasing force is exerted by the pressure differential across the piston 98, the sleeve 94 and the piston will displace upwardly as shown in FIGS. 6B & C.

Several functions are performed by upward displacement of the sleeve 94. However, before displacing the sleeve 94, the probe 48 should be appropriately positioned in the housing 32 so that when the sleeve 94 is displaced, the connector 54 in the probe will be properly displaced into operative connection with the connector 36 in the housing.

To longitudinally align the probe 48 relative to the housing 32, an external shoulder 110 on the probe is engaged with an internal shoulder 112 formed in the housing 32. This type of engagement is known as a "no-go" and prevents further downward displacement of the probe 48 relative to the housing 32.

Rotational alignment between the probe 48 and the housing 32 is provided by engagement between an internal alignment member 114 on the housing and an external alignment profile 116 formed on the probe. Preferably, the member 114 engages the profile 116 well before the shoulders 110, 112 engage so that the probe 48 is rotationally aligned with the housing 32 before further downward displacement of the probe is prevented. A swivel 118 is provided in the probe 48 so that an upper portion of the probe in the housing 32 can rotate relative to a lower portion of the probe below the housing as the upper portion of the probe is rotationally aligned with the housing.

After the probe 48 is longitudinally and rotationally aligned with the housing 32, the sleeve 94 is displaced upward as described above. One function performed by displacement of the sleeve 94 is to lock the probe 48 in position in the housing 32 by outwardly displacing keys 120 on the. probe into engagement with an internal profile 122 formed in the housing.

To outwardly displace the keys 120, a sleeve assembly 124 of the probe 48 is displaced upward with the sleeve 94 of the running tool 46, until a radially enlarged outer surface of the sleeve assembly 124 outwardly supports the keys in engagement with the profile 122. The sleeve assembly 124 displaces upwardly with the sleeve 94 due to engagement between lugs 126 of the running tool 46 and an internal profile 128 formed in the sleeve assembly 124.

Another function performed by displacement of the sleeve 94 is to displace the connector 54 of the probe 48 toward the connector 36 in the housing 32 so that the connectors are operatively connected. Upward displacement of the sleeve 94 causes upward displacement of the sleeve assembly 124 (as described above), which in turn causes upward displacement of another sleeve 130 connected to a parallelogram linkage mechanism 132 of the probe 48.

Figure 5D:
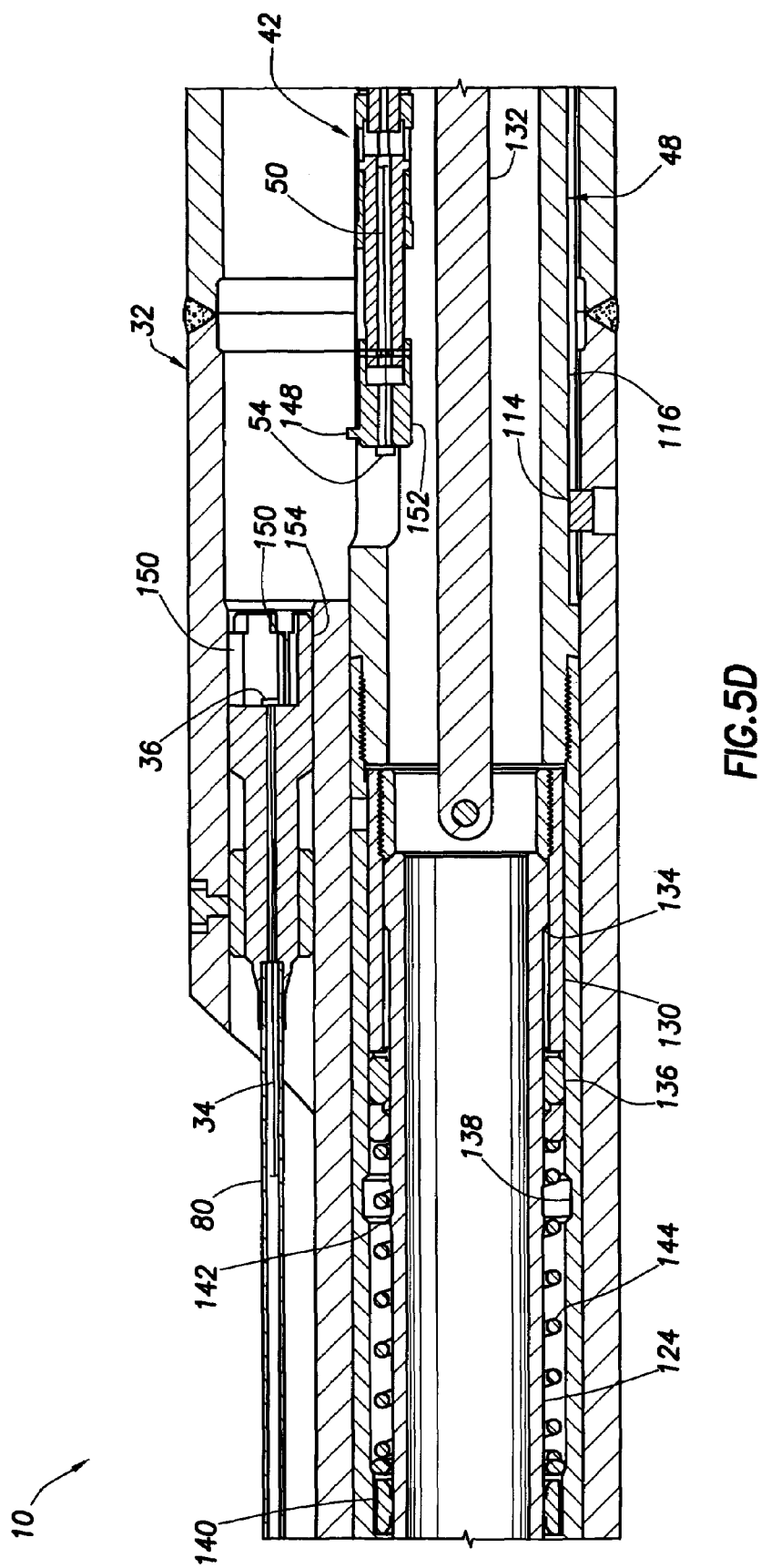

Upward displacement of the sleeve assembly 124 causes upward displacement of the sleeve 130 when an external shoulder 134 on the sleeve assembly 124 engages lugs 136 carried on the sleeve 130. Prior to the sleeve 130 being displaced upward, the lugs 136 extend inwardly from the sleeve 130 as depicted in FIG. 5D.

Figure 6D:
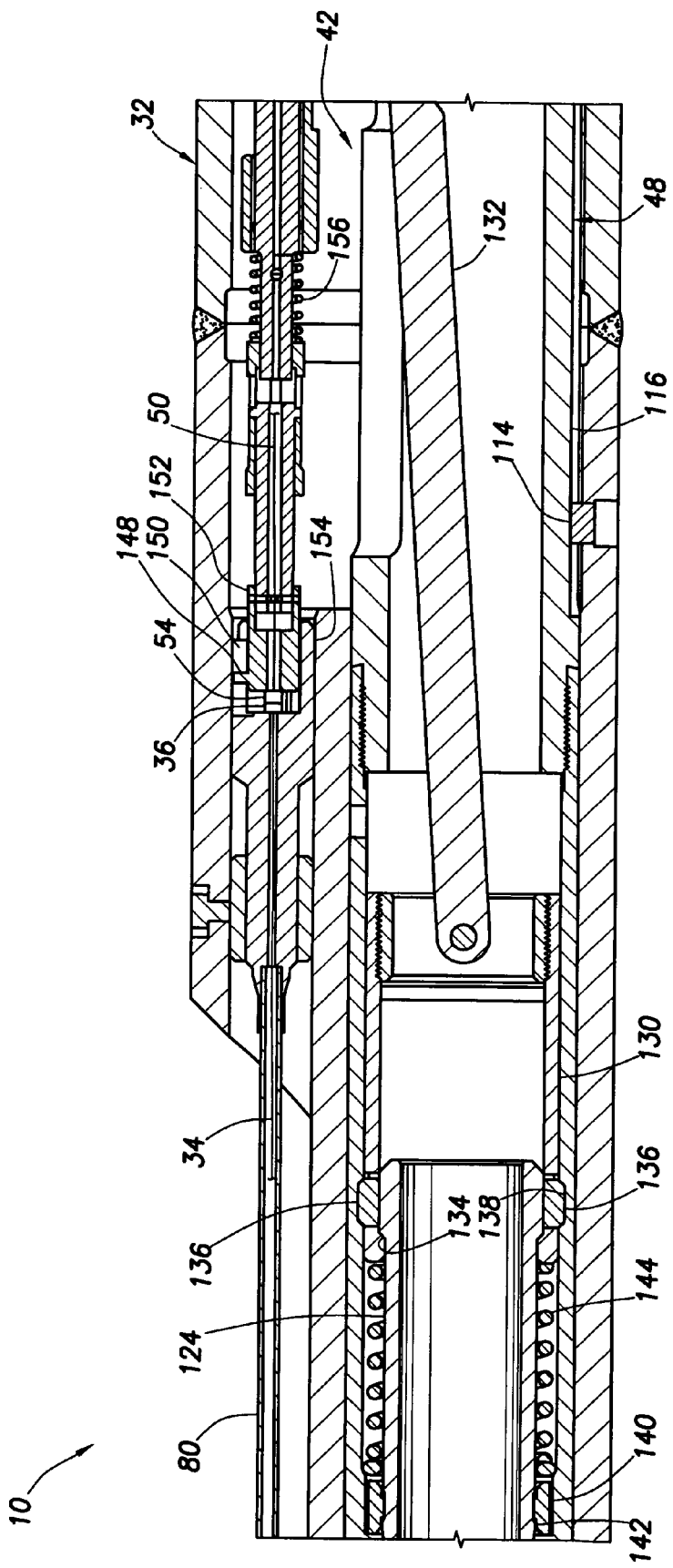
Figure 5E:
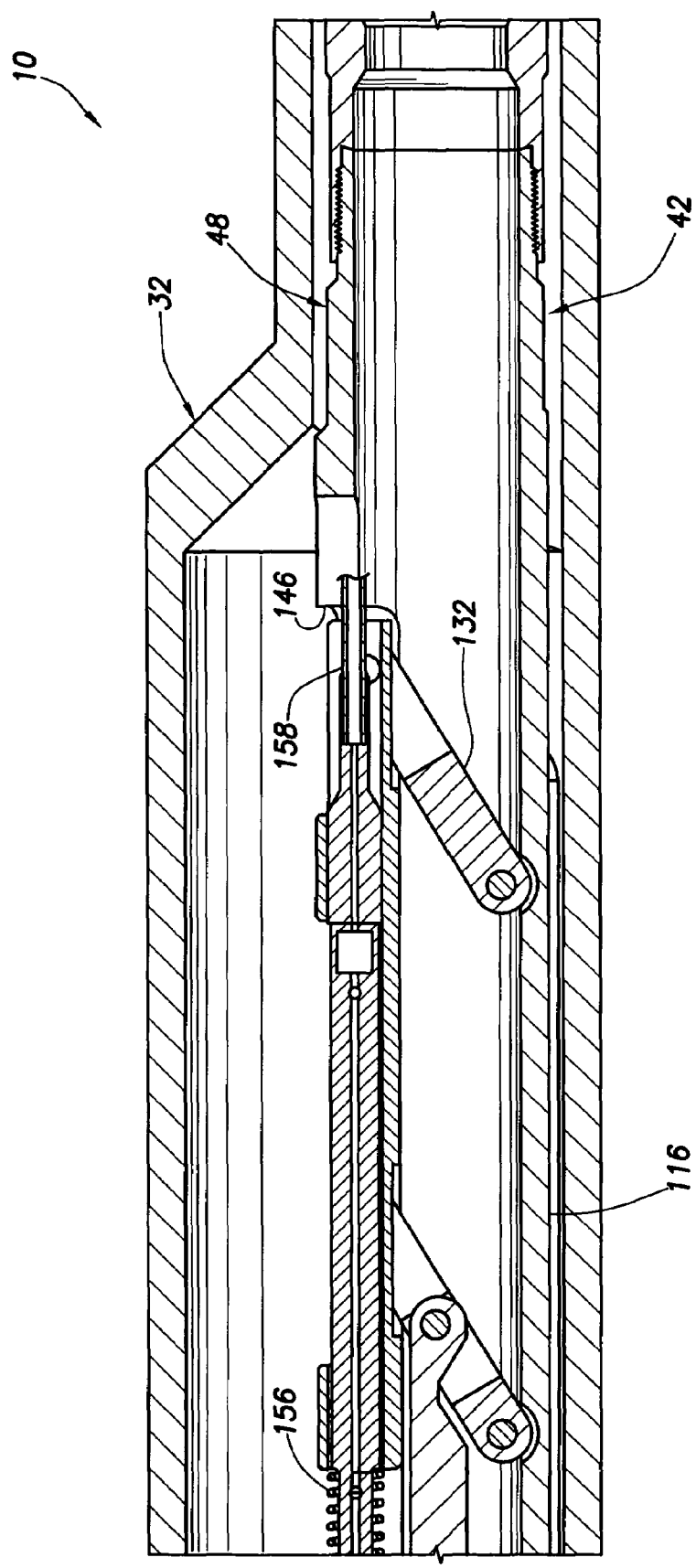
Figure 6E:
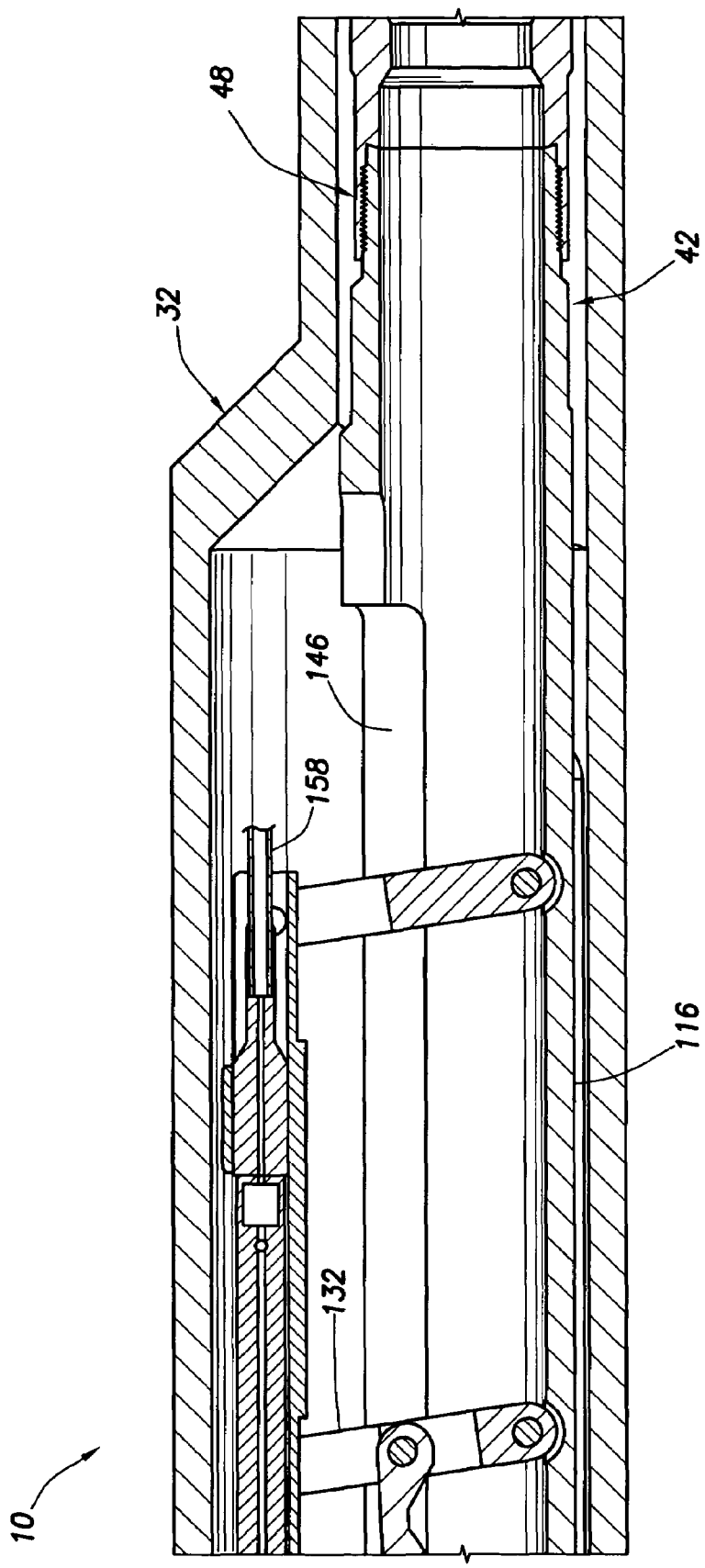

When the sleeve 130 has been sufficiently displaced upward to fully actuate the linkage mechanism 132, the lugs 136 are positioned adjacent an internal profile 138 formed in the probe 48. The lugs 136 outwardly displace into engagement with the profile 138 and are outwardly supported in such engagement by a radially enlarged outer surface of the sleeve assembly 124, thereby locking the sleeve 130 in this position with the linkage mechanism 132 fully actuated. The sleeve assembly 124 is retained in its position outwardly supporting the lugs 136 by engagement between a snap ring or C-ring 140 and a radially enlarged annular bump 142 on an outer surface of the sleeve assembly, as depicted in FIG. 6D.

A spring or other biasing device 144 exerts a downward biasing force against the sleeve 130 as the assembly 42 is being installed, thereby helping to prevent the linkage mechanism 132 from actuating prematurely. After the linkage mechanism 132 has been fully actuated and the bump 142 has been displaced upwardly past the C-ring 140, the sleeve 130 may only be unlocked by applying a sufficient downwardly directed force to the sleeve assembly 124 to cause the bump 142 to displace downwardly through the C-ring 140, thereby permitting inward displacement of the lugs 136 out of engagement with the profile 138.

Note that the assembly 42 is configured so that the keys 120 engage the profile 122 prior to the shoulder 134 engaging the lugs 136 due to upward displacement of the sleeve assembly 124. This ensures that the probe 48 is secured in position relative to the housing 32 prior to the linkage mechanism 132 being actuated.

When the linkage mechanism 132 is actuated, the connector 54 is displaced outwardly through a window 146 in a side of the probe 48, and upwardly toward the connector 36 in the housing 32. A carrier 152 for the connector 54 enters a closely fitted cavity in a carrier 154 for the connector 36 to ensure that the connectors are axially aligned as they are connected. One or more alignment members 148 on the carrier 152 engage one or more profiles 150 on the carrier 154 to ensure that the connectors 36, 54 are properly rotationally aligned as they are connected.

A spring or other biasing device 156 exerts an upwardly directed biasing force against the carrier 152 to help maintain the operative connection between the connectors 36, 54.

Note that a conduit 158 extends downwardly from the linkage mechanism 132. The conduit 158 preferably extends into the tubular member 52, but it could be external to the tubular member if desired. The optical line 50 extends within the conduit 158 so that the conduit protects the optical line from damage.

If a satisfactory connection between the connectors 36, 54 is not initially obtained, the connectors can be disconnected by increasing the pressure in the passage 44 relative to pressure in the passage 100, for example, by releasing the pressure applied to the passage 100 and applying sufficient pressure to the passage 44 to cause the piston 98 to displace downwardly. This will in turn cause the sleeve assembly 124 to displace downwardly (due to engagement between an external shoulder 160 on the running tool 46 and an internal shoulder formed on the sleeve assembly), thereby unlocking the sleeve 130, displacing the sleeve downwardly and retracting the linkage mechanism 132. The pressure differential across the piston 98 may be reversed to alternately actuate and retract the linkage mechanism 132 as many times as is necessary to achieve operative connection between the connectors 36, 54.

Another function performed by upward displacement of the sleeve 94 is to release the running tool 46 from the probe 48 after the linkage mechanism 132 has been fully actuated. When the sleeve 94 is displaced upwardly as depicted in FIG. 6C, the lugs 90 are no longer outwardly supported by the sleeve and the lugs can displace inwardly out of engagement with the profile 92. In addition, upward displacement of the sleeve 94 causes the lugs 126 to no longer be outwardly supported by the mandrel 96 and the lugs can displace inwardly out of engagement with the profile 128.

Preferably, the lugs 126 are disengaged from the profile 128 prior to the lugs 90 being disengaged from the profile 92 so that, when the lugs 126 are disengaged, the lugs 90 continue to support any weight or tension which would otherwise be applied via the running tool 46 to the probe 48.

At this point, the running tool 46 is released from the probe 48 and the running tool can be retrieved from the well. However, the running tool 46 can also be used to later retrieve the probe 48, e.g., for maintenance, repair or replacement. A rupture disk 168 may be ruptured once the decision has been made to retrieve the running tool 46, so that a wet string or conveyance 40 does not have to be pulled. As long as the rupture disk 168 in the running tool 46 has not ruptured, the operator can disengage and re-engage the probe 48 as many times as desired in a single trip.

The operation to retrieve the probe 48 is basically the reverse of the installation operation, in that the running tool 46 is engaged with the probe as shown in FIG. 6C, and then pressure in the passage 44 is increased relative to pressure in the passage 100 to cause the piston 98 and sleeve 94 to displace downwardly, thereby returning the assembly 42 to the configuration shown in FIGS. 5A-F. Note that use of the ball 104 and release mechanism 106 is not necessary in the retrieval operation, since a pressure differential from the passage 44 to the passage 100 may be maintained without plugging the passage 100, due to isolation between the passages being provided by engagement between seals 164 carried on the running tool 46 with a seal bore 166 in the housing 32. However, without the ball 104, there may be a significant piston effect trying to push the running tool 46 out of the probe 48.

When the sleeve 94 is displaced downwardly, the assembly 42 is configured so that the lugs 90 engage the profile 92 prior to the lugs 126 engaging the profile 128. This effectively secures the running tool 46 to the probe 48 so that the running tool can apply a downwardly directed biasing force to the sleeve assembly 124 to retract the linkage mechanism 132 and then permit inward displacement of the keys 120 out of engagement with the profile 122. The probe 48 can then be retrieved with the running tool 46.

As described above, the running tool 46, when operatively engaged with the probe 48, can be used to connect and disconnect the connectors 36, 54 any number of times by alternately extending and retracting the linkage mechanism 132. The running tool 46 may also be engaged with, and disengaged from, the probe 48 as many times as desired on a single trip into the well.

Certain features of the running tool 46 ensure that the running tool is properly engaged with, and disengaged from, the probe 48. A socket head cap screw 170 is used to keep a lug housing 172 and the lugs 126 in alignment with a shifting sleeve 174 and lugs 176. This maintains lugs 126 over lugs 176 at all times.

The lugs 176 serve two purposes. First, the lugs 176 support lugs 126 when shifting the probe 48 into and out of place. Second, the lugs 176 allow the lugs 126 to slide across their upper surface and drop down below the outer diameter of the lug housing 172.

A spring 178 biases the lug 126 into position on top of lugs 176. Additional locking lugs 180 will lock the lug housing 172 into place when shifting the probe 48. The locking lugs 180 lock the lug housing 172 and lugs 126 into place, forcing the probe 48 to shift into the run position. FIG. 5C shows the lugs 180 dropped down and unlocking the lug housing 172.

Gravity, inertia and the spring 144 force the sleeve assembly 124 the rest of the way into the run position. By this point the probe 48 is already in the run position because of the space between the shoulder 134 and lug 136. When the running tool 46 is inserted into the probe 48, the lugs 126 will contact the upper end of the sleeve assembly 124, the lug housing 172 will briefly cease moving while the sleeve 94 continues to displace downwardly, compressing the spring 178 and permitting the lugs 126 to retract inwardly as the lugs 176 continue to displace downwardly. Once the lugs 126 have retracted, they can displace downwardly past the upper end of the sleeve assembly 124 and extend outwardly into engagement with the profile 128, aided by the force exerted by the spring 178 which displaces the lug housing 172 downwardly.

If an operator tries to incorrectly retrieve the probe 48 (without first engaging the lugs 90), then the lugs 126 will not grab the profile 92. If operator tries to incorrectly retrieve the probe 48, the sleeve assembly 124 will be pushed down, effectively disengaging the stinger, however, the lugs 90, 126 will not operatively engage in their respective profiles 92, 128. Thus, the lugs 90 must engage the profile 92 prior to the lugs 126 engaging the profile 128, and the lugs 90 must disengage from the profile 92 after the lugs 126 disengage from the profile 128. This prevents incorrect retrieval of the probe 48.

Although the above description of the embodiment shown in FIGS. 5A-6F includes use of the linkage mechanism 132, it will be readily appreciated that this embodiment could instead, or in addition, use the piston 82 attached to the connector 54 as depicted in FIG. 4, or the connection between the connectors 36, 54 achieved by displacement of the assembly 42 as depicted in FIGS. 2 & 3. Indeed, any of the embodiments described herein may include, in substitution or addition, any of the features of any of the other embodiments.

Referring additionally now to FIGS. 7-10, another alternate configuration of the system 10 is representatively illustrated. The embodiment depicted in FIGS. 7-10 is somewhat similar to that in FIGS. 5A-6F, however in the FIGS. 7-10 embodiment, the optical connector 54 is included in a pivoting mechanism 180 instead of the linkage mechanism 132. In addition, different methods are used for positioning the probe 48 in the receptacle 32, securing the probe relative to the receptacle and displacing the connector 54 so that it operatively connects with the optical connector 36 in the receptacle.

Figure 7:
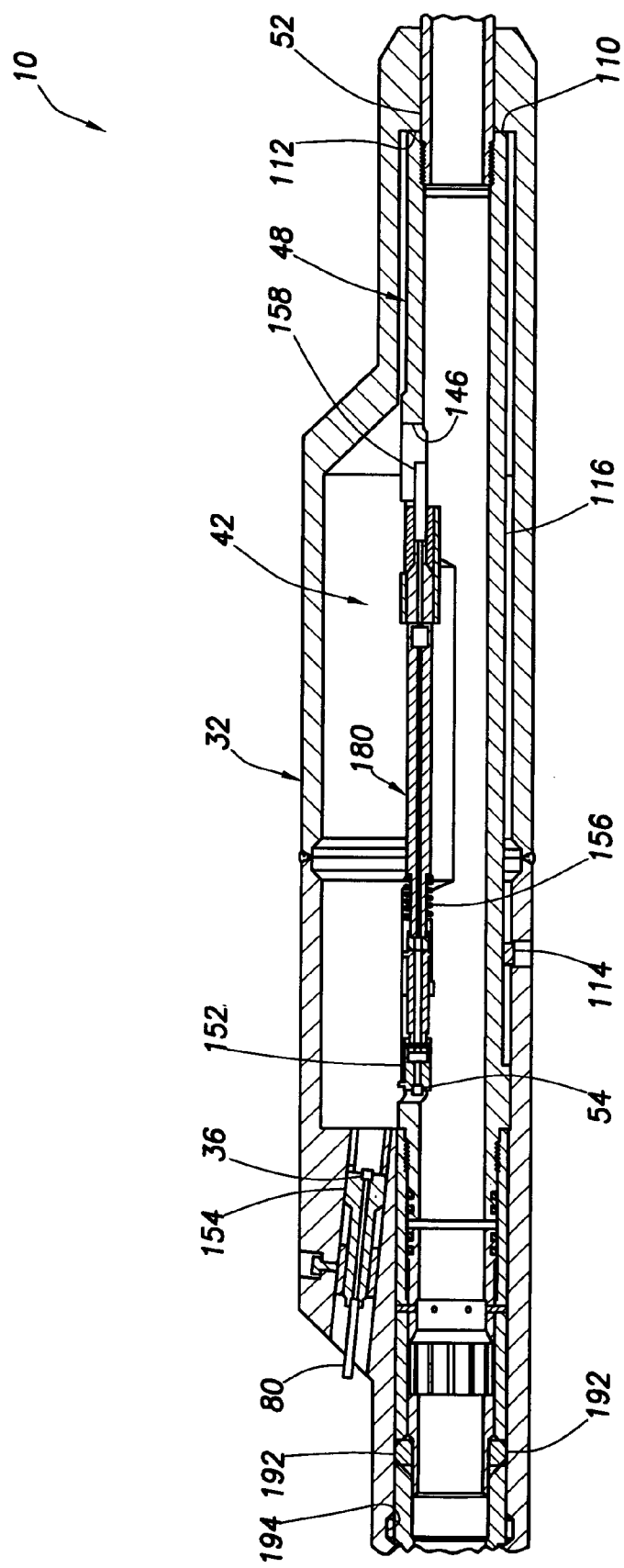
FIG. 7 is a schematic cross-sectional view of another fiber optic delivery system embodying principles of the present invention, the system being shown in a run-in configuration.
Figure 8:
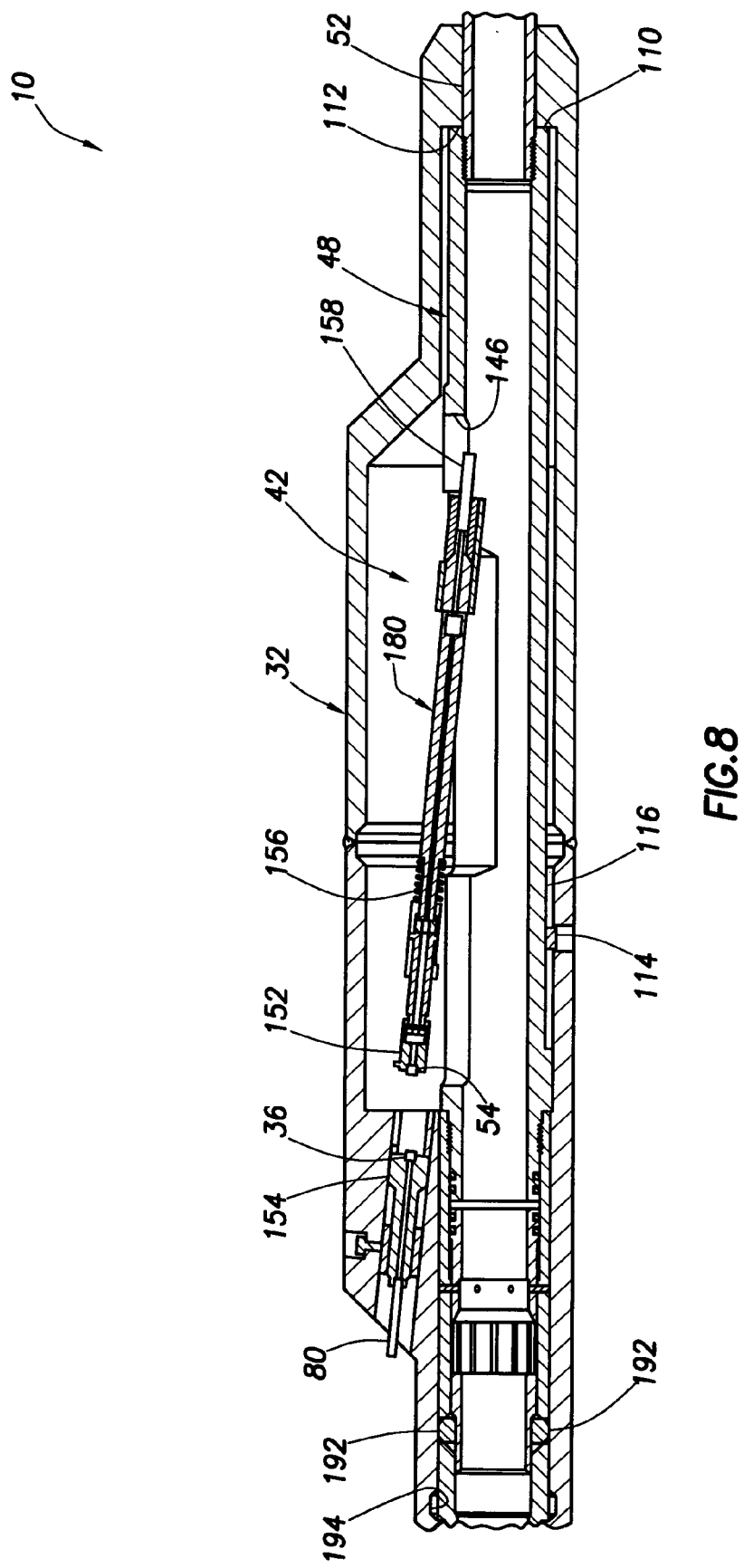
FIG. 8 is a schematic cross-sectional view of the system of FIG. 7, the system being shown with an optical connector deployed.
Figure 10:
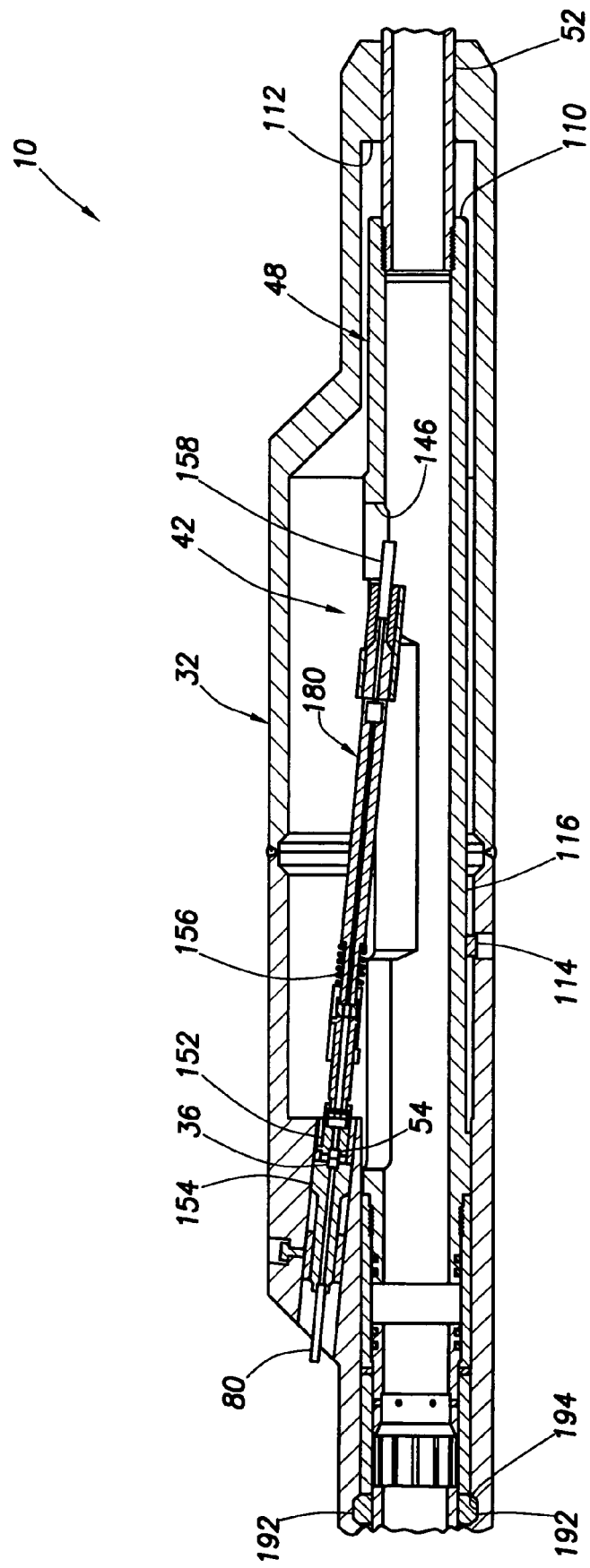
FIG. 10 is a schematic cross-sectional view of the system of FIG. 7, the system being shown with optical connectors thereof connected.

In the run-in configuration depicted in FIG. 7, the pivoting mechanism 180 is retracted, so that it is received in the window 146 of the probe 48. For clarity, only a portion of the pivoting mechanism 180 is shown in FIGS. 7, 8 & 10.

Note that the connector 36 and carrier 154 are laterally inclined in the receptacle 32, similar to the configuration of these elements schematically shown in FIG. 4. When the pivoting mechanism 180 is actuated (as described in more detail below), the carrier 152 and connector 54 will pivot outward from the window 146 to thereby align the carrier 152 and connector 54 with the carrier 154. and connector 36 in the receptacle 32.

Prior to actuating the pivoting mechanism 180, the assembly 42 is displaced through the tubular string 26 until it is received within the receptacle 32 and the external shoulder 110 engages the internal shoulder 112 in the receptacle as shown in FIG. 7. At this time, the member 114 has also engaged the profile 116, thereby rotationally aligning the probe 48 with the receptacle 32 as described above.

Thus, as depicted in FIG. 7, the probe 48 is both axially and rotationally aligned with the receptacle 32 prior to actuating the pivoting mechanism 180. Note that, at this point, the probe 48 is not yet securely anchored to the receptacle 32.

Referring now to FIG. 8, the system 10 is shown with the pivoting mechanism 180 in its deployed position. The pivoting mechanism 180 has been pivoted outward from the window 146, so that the carrier 152 and connector 54 are now aligned with the carrier 154 and connector 36 in the receptacle 32.

Actuation of the pivoting mechanism 180 is similar to that described above for the linkage mechanism 132 in the embodiment of FIGS. 5A-6F. Specifically, pressure is applied to the running tool 46 to cause the sleeve 130 to displace upwardly. The sleeve 130 is locked in its upwardly displaced position by engagement of the lugs 136 in the profile 138, as depicted in FIG. 6D.

However, unlike the embodiment of FIGS. 5A-6F, the probe 48 itself is not axially secured relative to the receptacle 32 when the pivoting mechanism 180 is actuated in the FIGS. 7-10 embodiment. Instead, the probe 48 and the remainder of the assembly 42 can be displaced upward relative to the receptacle 32.

Figure 9:
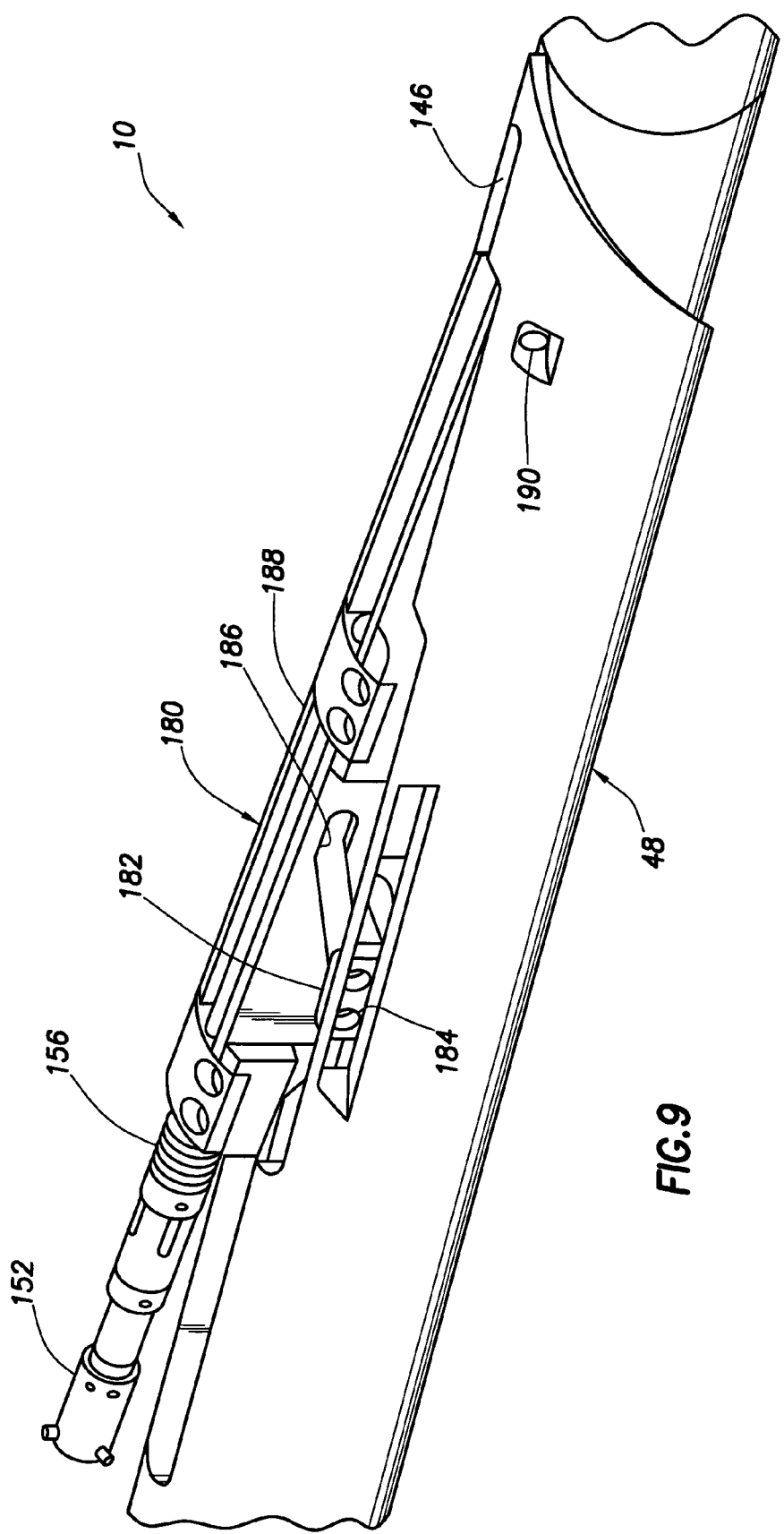
FIG. 9 is an enlarged isometric view of an upper portion of a probe of the system of FIG. 7, showing the deployed configuration.

Referring now to FIG. 9, a more detailed view of an upper portion of the probe 48 is depicted. In this view, further elements of the pivoting mechanism 180 are illustrated, enabling a more complete understanding of how the pivoting mechanism is actuated.

A pin carrier 182 is reciprocably mounted within the upper portion of the probe 48. The pin carrier 182 is connected to the sleeve 130, so that the pin carrier displaces upward when the sleeve displaces upward, as described above.

The pin carrier 182 has at least one pin 184 therein which engages a profile 186 formed on a body 188 of the pivoting mechanism 180. Preferably, a pin 184 and profile 186 are located on each side of the body 188.

As the pin carrier 180 displaces upward with the sleeve 130, engagement between the pin 184 and the profile 186 forces the body 188 to displace outward from the probe 48. The body 188 rotates about one or more pivot pin 190 at a lower end of the window 146. Thus, when the sleeve 130 is displaced upward, the pivoting mechanism 180 is deployed to pivot the carrier 152 and connector 54 therein outward from the probe 48.

Note that the pivoting mechanism 180 can be actuated using other methods if desired. It is not necessary for the pivoting mechanism 180 to actuate in response to displacement of the sleeve 130. For example, the pivoting mechanism 180 could be actuated by displacement of another element of the running tool 46 or probe 48.

Referring now to FIG. 10, after the pivoting mechanism 180 is deployed, the assembly 42 is displaced upward to thereby displace the connectors 36, 54 into operative engagement with each other. Note that the shoulders 110, 112 are no longer engaged and the probe 48 is upwardly displaced relative to the receptacle 32, as compared to the configuration depicted in FIG. 8.

When the connectors 36, 54 have been operatively connected to each other, lugs 192 carried on the probe 48 are displaced outwardly into engagement with a profile 194 formed in the receptacle 32. This engagement between the lugs 192 and profile 194 axially secures the probe 48 to the receptacle 32.

Prior to engaging the lugs 192 with the profile 194, the probe 48 may be displaced upwardly and downwardly in the receptacle 32 to thereby connect and disconnect the connectors 36, 54 repeatedly if needed to obtain a satisfactory operative connection between the connectors. After a satisfactory operative connection is obtained, the lugs 192 may be engaged with the profile 194 to axially secure the probe 48 relative to the receptacle 32.

The running tool 46 can now be disconnected from the probe 48 as described above for the embodiment of FIGS. 5A-6F. Once disconnected, the running tool 46 can be reconnected to the probe 48 to retrieve the probe for replacement, maintenance, repair, etc., as described above.

Although in the FIGS. 7-10 embodiment an upward displacement of the probe 48 is used to displace the connectors 36, 54 into engagement with each other, it will be readily appreciated that a downward or other direction of displacement (e.g., rotational, helical, etc.) of the probe 48 could alternatively be used to connect the connectors.

Although in the FIGS. 7-10 embodiment the probe 48 is described as being unsecured axially relative to the receptacle 32 when the pivoting mechanism 180 is actuated, this is not necessary in keeping with the principles of the invention. The probe 48 could be secured relative to the receptacle 32 while the pivoting mechanism 180 is displaced upwardly relative to the remainder of the probe, for example, by using a reciprocating mechanism in the upper portion of the probe to displace the pivoting mechanism upward (e.g., with the sleeve 130) while the remainder of the probe is held motionless relative to the receptacle.

Alternatively, or in addition, the running tool 46 could be secured relative to the receptacle 32 while the pivoting mechanism 180 is deployed, for example, using selective keys carried on the running tool engaged with a profile formed in the receptacle or in the tubular string 26 above the receptacle, such as the keys 120 and profile 122 described above and shown in FIGS. 5C & 6C (but carried on the running tool instead of on the probe 48). After the pivoting mechanism 180 is deployed and the connector 54 is displaced into operative connection with the connector 36, the probe 48 could then be secured relative to the receptacle 32 using the lugs 192, or the probe could be secured relative to the receptacle prior to actuating the pivoting mechanism or connecting the connectors 36, 54, as described above, and the running tool 46 could then be released for displacement relative to the receptacle 32 and tubular string 26 by disengaging the keys 120 from the profile 122.

Of course, a person skilled in the art would, upon a careful consideration of the above description of the representative embodiments of the invention, readily appreciate that many modifications, additions, substitutions, deletions, and other changes may be made to these specific embodiments, and such changes are contemplated by the principles of the present invention. Accordingly, the above detailed description is to be clearly understood as being given by way of illustration and example only, the spirit and scope of the present invention being limited solely by the appended claims and their equivalents.

What is claimed is:

1. A system for making optical connections in a subterranean well, the system comprising:
   a first optical connector included in a tubular string positioned in the well;
   a second optical connector displaceable into operative connection with the first optical connector after the first optical connector is positioned in the well; and
   a shield having a first position in which the shield is interposed between the first optical connector and a selected one of an interior passage of the tubular string and an exterior of the tubular string, and a second position in which the first optical connector is exposed to the selected one of the interior passage and the exterior of the tubular string.

2. The system of claim 1, wherein the second optical connector is included in an assembly disposed in the selected one of the interior passage and the exterior of the tubular string, the assembly being capable of displacing the shield between the first and second positions.

3. The system of claim 2, wherein the assembly further includes first and second sections releasably attached to each other, and an optical line extendable between the first and second sections when the first and second sections are detached from each other in the well.

4. The system of claim 1, wherein the second optical connector is included in an assembly positioned in the selected one of the interior passage and the exterior of the tubular string, displacement of the assembly causing the second optical connector to displace into operative connection with the first optical connector.

5. A system for making optical connections in a subterranean well, the system comprising:
a first optical connector included in a tubular string positioned in the well; and
a second optical connector displaceable into operative connection with the first optical connector after the first optical connector is positioned in the well, and
wherein at least one of the first and second optical connectors is pivotable to thereby align the first and second optical connectors.

6. A system for making optical connections in a subterranean well, the system comprising:
a first optical connector positioned in the well; and
a second optical connector displaceable into operative connection with the first optical connector after the first optical connector is positioned in the well, and
wherein the second optical connector is included in an assembly having releasably attached first and second sections, the second optical connector being attached to the first section, and an optical line extending between the second optical connector and the second section.

7. The system of claim 6, wherein at least one of the first and second sections is engageable with a portion of a tubular string in the well to thereby detach and space apart the first and second sections from each other and extend the optical line along the tubular string between the spaced apart first and second sections.

8. A system for making optical connections in a subterranean well, the system comprising:
a first optical connector; and
a shield having a first position in which the shield is disposed between the first optical connector and a selected one of an interior passage of a tubular string and an exterior of the tubular string, and a second position in which the first optical connector is exposed to the selected one of the interior passage and the exterior of the tubular string.

9. The system of claim 8, wherein the first optical connector is pivotably mounted.

10. The system of claim 9, wherein the shield in the first position prevents pivoting displacement of the first optical connector, and the shield in the second position permits pivoting displacement of the first optical connector.

11. The system of claim 8, further comprising a biasing device which biases the shield toward the first position.

12. The system of claim 8, further comprising a ratchet device which controls displacement of the shield between the first and second positions.

13. The system of claim 12, wherein the ratchet device comprises a J-slot mechanism.

14. The system of claim 8, further comprising an assembly which is configured to displace the shield between the first and second positions.

15. The system of claim 14, wherein the assembly is received in the selected one of the interior passage and the exterior of the tubular string.

16. The system of claim 14, wherein the assembly is engageable with the shield in the selected one of the interior passage and the exterior of the tubular string.

17. The system of claim 14, wherein an engagement member of the assembly is selectively engageable with a profile formed on the shield.

18. The system of claim 14, wherein displacement of the assembly causes displacement of the shield between the first and second positions.

19. The system of claim 14, wherein displacement of the assembly causes displacement of the shield against a force exerted by a biasing device.

20. The system of claim 14, wherein displacement of the assembly causes displacement of the shield, and wherein a ratchet device selects which of the first and second positions the shield displaces to in response to displacement of the assembly.

21. The system of claim 14, wherein a second optical connector of the assembly operatively engages the first optical connector after the shield displaces to the second position.

22. The system of claim 14, wherein displacement of the assembly in a first direction relative to the tubular string causes displacement of the shield from the first to the second position, and wherein displacement of the assembly in a second direction relative to the tubular string causes a second optical connector of the assembly to operatively engage the first optical connector.

23. The system of claim 14, wherein the assembly includes a second optical connector operatively engageable with the first optical connector.

24. The system of claim 23, wherein the second optical connector is operatively coupled to an optical line of the assembly.

25. The system of claim 24, wherein the optical line extends longitudinally through an interior of the assembly.

26. The system of claim 24, wherein the optical line extends exterior to the assembly.

27. The system of claim 24, wherein the optical line extends within a sidewall of a tubular portion of the assembly.

28. The system of claim 24, wherein the optical line extends longitudinally through an interior of a tubular portion of the assembly.

29. The system of claim 24, wherein the optical line extends longitudinally along a well screen interconnected in the tubular string.

30. The system of claim 24, wherein the assembly includes first and second releasably attached sections, and wherein the optical line extends between the first and second sections when the first and second sections are detached and spaced apart from each other in the well.

31. The system of claim 8, wherein a second optical connector is included in an assembly positioned within the selected one of the interior passage and the exterior of the tubular string, displacement of the assembly causing the second optical connector to displace into operative connection with the first optical connector.

32. The system of claim 8, wherein a second optical connector is included in an assembly positioned within the selected one of the interior passage and the exterior of the tubular string, force applied to the assembly causing the second optical connector to displace into operative connection with the first optical connector.

33. The system of claim 8, further comprising a second optical connector, and wherein at least one of the first and second optical connectors is pivotable to thereby align the first optical connector with the second optical connector.

34. The system of claim 8, wherein a second optical connector is included in an assembly having releasably attached first and second sections, the second optical connector being attached to the first section, and an optical line extending between the second optical connector and the second section.

35. The system of claim 34, wherein at least one of the first and second sections is engageable with a portion of a tubular string in the well to thereby detach and space apart the first and second sections from each other and extend the optical line along the tubular string between the spaced apart first and second sections.

36. The system of claim 35, wherein the other of the first and second sections is configured to displace the shield between the first and second positions.

37. The system of claim 36, wherein displacement of the other of the first and second sections causes the second optical connector to operatively connect with the first optical connector.

38. A system for making optical connections in a subterranean well, the system comprising:
an assembly positioned in the well, the assembly having first and second releasably attached sections, and an optical line extending between the first and second sections when the first and second sections are detached from each other in the well; and
a first optical connector disposed proximate a tubular string in the well.

39. The system of claim 38, further comprising a second optical connector disposed in the first section.

40. The system of claim 39, wherein the second optical connector is operatively connected to the first optical connector when the first and second sections are detached from each other in the well.

41. The system of claim 39, wherein the second optical connector is operatively connected to the first optical connector in response to displacement of the first section.

42. The system of claim 39, wherein the second optical connector is operatively connected to the first optical connector in response to displacement of the first section relative to the second section.

43. A system for making optical connections in a subterranean well, the system comprising:
an assembly positioned in the well, the assembly having first and second releasably attached sections, and an optical line extending between the first and second sections when the first and second sections are detached from each other in the well,
wherein displacement of the first section displaces a shield from a first position in which the shield is disposed between a first optical connector and a selected one of an interior passage of a tubular string and an exterior of the tubular string, and a second position in which the first optical connector is exposed to the selected one of the interior passage and exterior of the tubular string.

44. The system of claim 43, wherein the first optical connector is pivotably mounted in the well.

45. The system of claim 44, wherein the shield in the first position prevents pivoting displacement of the first optical connector, and the shield in the second position permits pivoting displacement of the first optical connector.

46. The system of claim 43, further comprising a biasing device which biases the shield toward the first position.

47. The system of claim 43, further comprising a ratchet device which controls displacement of the shield between the first and second positions.

48. The system of claim 47, wherein the ratchet device comprises a J-slot mechanism.

49. The system of claim 43, wherein an engagement member of the first section is selectively engageable with a profile formed on the shield.

50. The system of claim 43, wherein a second optical connector of the first section operatively engages the first optical connector after the shield displaces to the second position.

51. The system of claim 43, wherein displacement of the first section in a first direction causes displacement of the shield from the first to the second position, and wherein displacement of the first section in a second direction causes a second optical connector of the assembly to operatively engage the first optical connector.

52. The system of claim 43, wherein the assembly includes a second optical connector operatively engageable with a first optical connector in the well.

53. The system of claim 52, wherein the second optical connector is operatively coupled to the optical line.

54. A system for making optical connections in a subterranean well, the system comprising:
an assembly positioned in the well, the assembly having first and second releasably attached sections, and an optical line extending between the first and second sections when the first and second sections are detached from each other in the well,
wherein the optical line is coiled prior to the first and second sections being detached from each other.

55. A system for making optical connections in a subterranean well, the system comprising:
an assembly positioned in the well, the assembly having first and second releasably attached sections, and an optical line extending between the first and second sections when the first and second sections are detached from each other in the well,
wherein a first optical connector is disposed in the well, and wherein a second optical connector is included in the assembly, force applied to the assembly causing the second optical connector to displace into operative connection with the first optical connector.

56. A system for making optical connections in a subterranean well, the system comprising:
an assembly positioned in the well, the assembly having first and second releasably attached sections, and an optical line extending between the first and second sections when the first and second sections are detached from each other in the well;
a first optical connector disposed in the well;
a second optical connector of the assembly; and
wherein at least one of the first and second optical connectors is pivotable to thereby align the first and second optical connectors.

57. A system for making optical connections in a subterranean well, the system comprising:
a tubular string including a first optical connector; and
an assembly received in the well, the assembly including a second optical connector, force applied to the assembly causing the second optical connector to displace and operatively connect with the first optical connector, and
wherein at least one of the first and second optical connectors is pivotable to thereby align the first and second optical connectors.

58. The system of claim 57, further comprising an orienting device which aligns the first and second optical connectors.

59. The system of claim 58, wherein the orienting device comprises a member of the assembly configured for engagement with a profile formed on the tubular string.

60. The system of claim 58, wherein the orienting device comprises a member of the tubular string configured for engagement with a profile formed on the assembly.

61. The system of claim 57, wherein the assembly includes releasably attached first and second sections, the second optical connector being attached to the first section, and an optical line extending between the second optical connector and the second section.

62. The system of claim 61, wherein at least one of the first and second sections is engageable with a portion of the tubular string to thereby detach and space apart the first and second sections from each other and extend the optical line along the tubular string between the spaced apart first and second sections.

63. A system for making optical connections in a subterranean well, the system comprising:
a tubular string including a first optical connector;
an assembly received in the well, the assembly including a second optical connector, force applied to the assembly causing the second optical connector to displace and operatively connect with the first optical connector; and
a shield having a first position in which the shield is disposed between the first optical connector and a selected one of an interior passage of the tubular string and an exterior of the tubular string, and a second position in which the first optical connector is exposed to the selected one of the interior passage and the exterior of the tubular string.

64. The system of claim 63, wherein at least one of the first and second optical connectors is pivotably mounted.

65. The system of claim 63, wherein the shield in the first position prevents pivoting displacement of the first optical connector, and the shield in the second position permits pivoting displacement of the first optical connector.

66. The system of claim 63, wherein the assembly is configured to displace the shield between the first and second positions.

67. The system of claim 63, wherein an engagement member of the assembly is selectively engageable with a profile formed on the shield.

68. The system of claim 63, wherein displacement of the assembly causes displacement of the shield between the first and second positions.

69. The system of claim 63, wherein displacement of the assembly causes displacement of the shield against a force exerted by a biasing device.

70. The system of claim 63, wherein displacement of the assembly causes displacement of the shield, and wherein a ratchet device selects which of the first and second positions the shield displaces to in response to displacement of the assembly.

71. The system of claim 63, wherein the second optical connector operatively engages the first optical connector after the shield displaces to the second position.

72. The system of claim 57, wherein the second optical connector is operatively coupled to an optical line of the assembly.

73. The system of claim 72, wherein the optical line extends longitudinally through an interior of the assembly.

74. The system of claim 72, wherein the optical line extends exterior to the assembly.

75. The system of claim 72, wherein the optical line extends within a sidewall of a tubular portion of the assembly.

76. The system of claim 72, wherein the optical line extends longitudinally along a well screen interconnected in the tubular string.

77. The system of claim 72, wherein the assembly includes first and second releasably attached sections, and wherein the optical line extends between the first and second sections when the first and second sections are detached and spaced apart from each other in the well.

78. A method of making optical connections in a subterranean well, the method comprising the steps of:
providing a tubular string with a first optical connector;
coiling an optical line in an assembly;
positioning the tubular string in the well;
then installing the assembly in the well, the assembly including a second optical connector, and the installing step including uncoiling the optical line; and
then displacing the second optical connector into operative engagement with the first optical connector.

79. The method of claim 78, further comprising the step of displacing a shield from a first position in which the shield is disposed between the first optical connector and a selected one of an interior passage of the tubular string and an exterior of the tubular string, to a second position in which the first optical connector is exposed to the selected one of the interior passage and the exterior of the tubular string.

80. The method of claim 79, wherein the shield displacing step is performed in response to displacing the assembly relative to the tubular string.

81. The method of claim 78, wherein the assembly installing step further comprises installing first and second releasably attached sections of the assembly, and then detaching the first and second sections from each other.

82. The method of claim 81, wherein the detaching step further comprises spacing apart the first and second sections along the tubular string, an optical line extending between the spaced apart first and second sections.

83. The method of claim 82, wherein in the detaching step, the optical line is operably coupled to the second optical connector.

84. The method of claim 82, wherein in the detaching step, the optical line extends at least partially along a well screen interconnected in the tubular string.

85. The method of claim 78, wherein the displacing step further comprises displacing the assembly relative to the tubular string to thereby displace the second optical connector into operative engagement with the first optical connector.

86. The method of claim 78, wherein the displacing step further comprises applying force to the assembly to thereby displace the second optical connector into operative engagement with the first optical connector.

87. The method of claim 78, further comprising the step of aligning the first and second optical connectors prior to the displacing step.

88. The method of claim 87, wherein the aligning step further comprises engaging a member of the assembly with an orienting profile formed on the tubular string.

89. The method of claim 87, wherein the aligning step further comprises engaging a member of the tubular string with an orienting profile formed on the assembly.

90. The method of claim 87, wherein the aligning step further comprises pivoting the first optical connector relative to the tubular string.

91. The method of claim 87, wherein the aligning step further comprises pivoting the second optical connector relative to the assembly.

92. The method of claim 78, further comprising the step of extending an optical line longitudinally through an interior of the assembly, the optical line being operably coupled to the second optical connector.

93. The method of claim 78, further comprising the step of extending an optical line external to the assembly, the optical line being operably coupled to the second optical connector.

94. The method of claim 78, further comprising the step of extending an optical line in a sidewall of a tubular portion of the assembly.

95. The method of claim 78, further comprising the step of extending an optical line between first and second sections of the assembly along the tubular string.

96. The method of claim 95, wherein the extending step further comprises latching the second section to the tubular string, detaching the first section from the second section, and spacing apart the first and second sections.

97. The method of claim 95, wherein the second optical connector displacing step further comprises displacing the first section relative to the tubular string.

* * * * *